(12) United States Patent
Thielke et al.

(10) Patent No.: US 11,733,427 B1
(45) Date of Patent: Aug. 22, 2023

(54) SHORT-TERM WEATHER FORECASTING USING HYBRID DATA

(71) Applicant: DATAINFOCOM USA, INC., Austin, TX (US)

(72) Inventors: Patrick John Thielke, Houston, TX (US); Wensu Wang, Katy, TX (US); Mubbashir Nazir, Kolkata (IN); Midhun Em, Kolkata (IN)

(73) Assignee: DataInfoCom USA, Inc., Austin, TX (US)

( * ) Notice: Subject to any disclaimer, the term of this patent is extended or adjusted under 35 U.S.C. 154(b) by 232 days.

(21) Appl. No.: 16/398,244

(22) Filed: Apr. 29, 2019

Related U.S. Application Data

(63) Continuation-in-part of application No. 16/147,371, filed on Sep. 28, 2018, which is a continuation-in-part (Continued)

(51) Int. Cl.
| | |
|---|---|
| *G01W 1/10* | (2006.01) |
| *G06N 3/04* | (2006.01) |
| *G06N 20/20* | (2019.01) |
| *G01W 1/06* | (2006.01) |
| *G06N 3/045* | (2023.01) |

(52) U.S. Cl.
CPC ............ *G01W 1/10* (2013.01); *G01W 1/06* (2013.01); *G06N 3/045* (2023.01); *G06N 20/20* (2019.01)

(58) Field of Classification Search
CPC .......... G01W 1/10; G01W 1/06; G06N 20/20; G06N 3/0454
See application file for complete search history.

(56) References Cited

U.S. PATENT DOCUMENTS

| | | | |
|---|---|---|---|
| 9,411,072 B1 * | 8/2016 | Dixon | G01W 1/00 |
| 10,078,155 B2 | 9/2018 | Elkabetz et al. | |

(Continued)

OTHER PUBLICATIONS

Jiahui Guo; Yilu Liu; Jim Glass; Matthew Gardner; Clifton Black; An Ensemble Solar Power Output Forecasting Model through Statistical Learning of Historical Weather Dataset; 2016; p. 1-5 (Year: 2016).*

(Continued)

*Primary Examiner* — Raymond L Nimox
(74) *Attorney, Agent, or Firm* — Chad Peterson

(57) ABSTRACT

Methods, systems, and apparatus, including computer programs encoded on computer storage media, for generating weather forecasting modules from historical weather data, including unstructured and structured data. The weather forecasting modules each comprise at least one model, such as a neural network, that generates a forecast from input weather data. Each module may be focused on a particular region, weather variable, and or forecasting time period. Unstructured data may be analyzed by the system to generate weather-related variables which are combined with structured weather data to generate a combined weather feature set that is input to the model. Alternatively, unstructured data may be input directly in the module, with or without preprocessing. The weather forecasts can then be used to forecast various power-generation related variables or events, including power generation, electrical load, etc.

16 Claims, 17 Drawing Sheets

Related U.S. Application Data of application No. 15/951,124, filed on Apr. 11, 2018, now Pat. No. 10,996,374.

(60) Provisional application No. 62/484,035, filed on Apr. 11, 2017.

(56) References Cited

U.S. PATENT DOCUMENTS

| | | | | |
|---|---|---|---|---|
| 10,613,252 | B1* | 4/2020 | Mecikalski | G06F 30/20 |
| 2002/0114517 | A1* | 8/2002 | Wolfson | G01S 13/951 |
| | | | | 382/181 |
| 2011/0261049 | A1* | 10/2011 | Cardno | G06Q 40/04 |
| | | | | 345/419 |
| 2012/0065788 | A1* | 3/2012 | Harper, III | G06F 1/329 |
| | | | | 700/291 |
| 2012/0155704 | A1* | 6/2012 | Williams | G06N 5/048 |
| | | | | 382/103 |
| 2013/0166266 | A1 | 6/2013 | Herzig et al. | |
| 2014/0058572 | A1* | 2/2014 | Stein | G06Q 50/06 |
| | | | | 700/291 |
| 2014/0195159 | A1* | 7/2014 | Mewes | G01W 1/10 |
| | | | | 702/3 |
| 2014/0244188 | A1* | 8/2014 | Bai | F03D 17/00 |
| | | | | 702/60 |
| 2014/0278108 | A1 | 9/2014 | Kerrigan et al. | |
| 2014/0324352 | A1 | 10/2014 | Hamann et al. | |
| 2014/0324532 | A1* | 10/2014 | Ghosh | G06Q 30/0202 |
| | | | | 705/7.31 |
| 2015/0186904 | A1* | 7/2015 | Guha | G06Q 50/06 |
| | | | | 705/7.26 |
| 2015/0212236 | A1 | 7/2015 | Haas et al. | |
| 2016/0104059 | A1 | 4/2016 | Wang et al. | |
| 2016/0363696 | A1 | 12/2016 | Dao et al. | |
| 2017/0016430 | A1* | 1/2017 | Swaminathan | G06Q 50/06 |
| 2017/0031056 | A1 | 2/2017 | Vega-Avila et al. | |
| 2017/0131435 | A1 | 5/2017 | Peacock et al. | |
| 2017/0299772 | A1* | 10/2017 | Yuzhakov | G01W 1/10 |
| 2018/0038994 | A1 | 2/2018 | Hamann et al. | |
| 2018/0275314 | A1* | 9/2018 | Pavlovski | H02S 50/10 |
| 2020/0132884 | A1 | 4/2020 | Rothenberg | |
| 2020/0309993 | A1 | 10/2020 | Ganshin et al. | |

OTHER PUBLICATIONS

Jie Shi; Wei-Jen Lee; Yongqian Liu; Yongping Yang; Peng Wang; Forecasting Power Output of Photovoltaic Systems Based on Weather Classification and Support Vector Machines; May/Jun. 2012; IEEE Transactions on Industry Applications, vol. 48, No. 3, p. 1064-1069 (Year: 2012).*

Nilay S. Kapadia; Urmil Parikh; Weather Forecasting using Satellite Image Processing and Artificial Neural Networks; Nov. 2016; International Journal of Computer Science and Information Security (IJCSIS), vol. 14, No. 11; p. 1069-1074 (Year: 2016).*

Machine learning can boost the value of wind energy; Feb. 29, 2019; downloaded from https://www.blog.google/technology/ai/machine-learning-can-boost-value-wind-energy/.

Mohamed Abuella and Badrul Chowdhury; Random Forest Ensemble of Support Vector Regression Models for Solar Power Forecasting; Proceedings of Innovative Smart Grid Technologies, North American Conference; 2017.

Cyril Voyant, Gilles Notton, Soteris Kalogirou, Marie-Laure Nivet, Christophe Paoli, Fabrice Motte, and Alexis Fouilloy; Machine learning methods for solar radiation forecasting: a review; Renewable Energy, vol. 105; May 2017; 569-582.

Lei Han, Juanzhen Sun, Wei Zhang, Yuanyuan Xiu, Hailei Feng, and Yinjing Lin; A Machine Learning Nowcasting Method based on Real-time Reanalysis Data; Journal of Geophysical Research: Atmospheres, vol. 122, Issue 7; Mar. 28, 2017.

Xiaoyan Shao, Siyuan Lu, and Hendrik F. Hamann; Solar radiation forecast with machine learning [Abstract]; 2016 23rd International Workshop on Active-Matrix Flatpanel Displays and Devices (AM-FPD); Jul. 2016; 19-22.

Sue Ellen Haupt and Branko Kosovic; Big Data and Machine Learning for Applied Weather Forecasts; 2015 IEEE Symposium Series on Computational Intelligence; 2015; 496-501.

Ricardo Marquez, Hugo T.C. Pedro, and Carlos F.M. Coimbra; Hybrid solar forecasting method uses satellite imaging and ground telemetry as inputs to ANNs; Solar Energy 92; 2013; 176-188.

Renate Hagedorn, Thomas M. Hamill and Jeffrey S. Whitaker; Probabilistic Forecast Calibration Using ECMWF and GFS Ensemble Reforecasts. Part I: Two-Meter Temperatures; Monthly Weather Review, vol. 136, Jul. 2008; 2608-2619.

Yibin Yao, Chaoqian Xu, Junbo Shi, Na Cao, Bao Zhang, and Junjian Yang; ITG: A New Global GNSS Tropospheric Correction Model; https://www.nature.com/articles/srep10273; Jul. 21, 2015.

Fei Wang, Zengqiang Mi, Shi Su, and Hongshan Zhao; Short-Term Solar Irradiance Forecasting Model Based on Artificial Neural Network Using Statistical Feature Parameters; Energies 2012; 1355-1370.

Jon Walker; AI for Weather Forecasting—In Retail, Agriculture, Disaster Prediction, and More; techemergence.com (retrieved from https://www.techemergence.com/ai-for-weather-forecasting/ Sep. 25, 2018); Oct. 7, 2017.

Mohamed Akram Zaytar; Chaker El Amrani; Sequence to Sequence Weather Forecasting with Long Short-Term Memory Recurrent Neural Networks; Jun. 2016; International Journal of Computer Applications (0975-8887) vol. 143—No. 11, p. 7-11 (2016).

Stephan Brusch; Susanne Lehner; Johannes Schulz-Stellenfleth; Synergetic Use of Radar and Optical Satellite Images to Support Severe Storm Predictions for Offshore Wind Farming; Mar. 2008; IEEE Journal of Selected Topics in Applied Earth Observations and Remote Sensing; vol. 1, No. 1; p. 57-66 (2008).

Andre Gensler; Janosch Henze; Bernhard Slck; Nils Raabe; Deep Learning for Solar Power Forecasting—An Approach Using Autoencoder and LSTM Neural Networks; Oct. 9-12, 2016; 2016 IEEE International Conference on Systems, Man, and Cybernetics—SMC 2016; p. 002858-002865 (2016).

Ryo Onishi; Daisuke Sugiyama; Deep Convolutional Neural Networks for Cloud Coverage Estimation from Snapshot Camera Images; 2017; SOLA, vol. 13, p. 235-239 (2017).

Sanju Kuril; Indu Saini; B.S. Saini; Cloud Classification for Weather Inforamtion by Artificial Neural Network; International Journal of Applied Mathematics, vol. 3, No. 1; Jan. 2013; p. 28-30 (2013).

* cited by examiner

SHORT-TERM WEATHER FORECASTING USING HYBRID DATA

CROSS-REFERENCE TO RELATED APPLICATIONS

This application is a continuation-in-part of U.S. patent application Ser. No. 16/147,371, titled "SHORT-TERM WEATHER FORECASTING USING HYBRID DATA," filed Sep. 28, 2018, which is a continuation-in-part of U.S. patent application Ser. No. 15/951,124, titled "SHORT-TERM WEATHER FORECASTING USING ARTIFICIAL INTELLIGENCE AND HYBRID DATA," filed Apr. 11, 2018, and claims the benefit of U.S. Provisional Application No. 62/484,035, titled "Weather Forecasting using Artificial Intelligence and Hybrid Data," filed Apr. 11, 2017, each of which are incorporated herein by reference in their entirety.

BACKGROUND

This disclosure relates to systems and methods for forecasting of weather and/or atmospheric conditions using artificial intelligence techniques and hybrid data.

Multiple industries are increasingly reliant on weather analytics and prediction systems to predict impactful events, business outcomes, and/or business outputs. For example, the energy output of solar energy companies is partially dependent on atmospheric conditions such as cloud cover, wind speed, solar irradiance, etc. Accurate predictions regarding the weather can help businesses preempt problems and improve business performance.

Conventional weather forecasting starts from initial atmospheric conditions, and applies known physics principles, supplemented by a variety of statistical and empirical techniques, to numerically simulate future atmospheric conditions at fixed spatial grids and temporal intervals. This is a complex and challenging process, and consumes large amounts of computational power. Because the equations that govern conventional models are chaotic, they are exceptionally sensitive to initialization errors, i.e., imprecision in measurement of initial conditions.

The two most widely-used models are those from the European Centre for Medium-Range Weather Forecasts in Europe (ECMWF) and the National Oceanic and Atmospheric Administration (NOAA)'s National Centers for Environmental Prediction (NCEP) in the United States. Others publish models which operate on the same physics principles described above.

However, these conventional weather forecasting systems lack the ability to quickly, accurately, and reliably forecast specific weather variables and/or atmospheric conditions that are important to certain industries, such as renewable energy. For example, they do a poor job of forecasting wind speed, cloud cover, and solar intensity—important variables that affect wind and solar power generation.

There remains a need for a weather forecasting system of greater accuracy, and less susceptible to initialization errors, than existing systems. It would be beneficial if such system would improve the forecasting accuracy of specific weather variables, such as cloud cover, wind speed and direction, air temperature, solar irradiance, atmospheric pressure, relative humidity, etc.

SUMMARY

In accordance with the foregoing objectives and others, exemplary methods and systems are disclosed herein to train modules that can forecast weather variables. The weather forecasting modules can be trained for accurate forecasts of a specific weather variable (e.g., cloud cover, wind speed and direction, air temperature, solar radiation, atmospheric pressure, relative humidity, etc.) at a particular location and/or time of year. After a weather forecasting module is trained, the module may be used to generate forecasts for the targeted weather variable. The weather forecasting modules may be trained to forecast a weather variable a specific time in the future, e.g., between approximately 3 hours and approximately 3 days in the future.

Each weather forecasting module may comprise a trained artificial intelligence (AI) model that accepts as input a combination of structured (e.g., data in a database, etc.) and unstructured (e.g., images, videos, audio, unstructured text, etc.) data and outputs a forecast for a particular weather variable a particular length of time in the future. The AI model may comprise any of a number of heuristics, algorithms, or neural networks, e.g., regression models, Markov chains, time series models, state space models, Bayesian models, boosted decision trees, neural networks, convolutional neural networks, recurrent neural networks (RNNs), long short-term memory networks, (LSTMs) or any other appropriate model or combination thereof.

The AI models may be trained using historical weather data, both structured and unstructured. In one embodiment, multiple models may be trained with respect to a particular weather variable, location, and/or time, and the most accurate one selected to be included in the particular weather forecasting module for that weather variable and location. The weather forecasting module(s) may then be used in future weather forecasts. The weather forecasts may be used to forecast power-related variables, e.g., power output, electrical load, etc.

In one embodiment, the present disclosure is directed to a method for forecasting a power-related variable, the method comprising: receiving historical unstructured weather data; processing the historical unstructured weather data to generate values for at least one weather variable; receiving historical structured weather data; combining the historical structured weather data with the generated weather variable values to create a combined weather feature set; selecting one or more first algorithms based on one of more characteristics of the combined weather feature set; training the one or more first algorithms to forecast a weather indicator at least in part using the combined weather feature set; receiving historical data for the power-related variable; training a second algorithm to forecast the power-related variable at least in part using the received historical data for the power-related variable and one or more of the historical unstructured weather data and the historical structured weather data; receiving current structured weather data and current unstructured weather data; and generating a forecast for the power-related variable using the current structured weather data, the current unstructured weather data, the one or more trained first algorithms, and the trained second algorithm.

In another embodiment, the present disclosure is directed to a method for forecasting a power-related variable, the method comprising: receiving current structured weather data and current unstructured weather data; and generating a forecast for the power-related variable using the current structured weather data, the current unstructured weather data, one or more trained first algorithms, and a trained second algorithm; wherein the one or more trained first algorithms are created by: receiving historical unstructured weather data; processing the historical unstructured weather data to generate values for at least one weather variable; receiving historical structured weather data; combining the historical structured weather data with the generated weather variable values to create a combined weather feature set; selecting one or more first algorithms based on one of more characteristics of the combined weather feature set; and training the one or more first algorithms to forecast a weather indicator at least in part using the combined weather feature set to create one or more trained first algorithms; and wherein the trained second algorithm is created by: receiving historical data for the power-related variable; and training a second algorithm to forecast the power-related variable at least in part using the received historical data for the power-related variable and one or more of the historical unstructured weather data and the historical structured weather data.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

The use of the same reference symbols in different drawings indicates similar or identical items.

DETAILED DESCRIPTION

Various methods and systems are disclosed to generate weather forecasting modules. Exemplary weather forecasting modules described herein process both structured and unstructured weather to generate more accurate forecasts of weather variables than conventional models. In addition, unlike conventional models, the disclosed methods and systems can be used to quickly train a new weather forecasting module that can accurately forecast a desired weather variable.

In an example embodiment, a system and method are disclosed for forecasting weather variables. Using various heuristics, algorithms, and/or artificial intelligence models (including but not limited to machine learning, deep learning, and computer vision algorithms) together with hybrid datasets (including but not limited to remote sensing/satellite images, weather forecast model outputs, and in-situ measurements, at both land and offshore sites), flexible weather modules may be generated that exhibit demonstrably more accurate predictions than conventional models.

"Weather variables" and "weather indicators," as used herein, includes any and all weather features, weather indicators, atmospheric conditions, etc., including but not limited to wind speed and direction, air temperature, solar irradiance, cloud cover, cloud type, atmospheric pressure, relative humidity, absolute humidity, dew point, precipitation (e.g., rain, snow, sleet, freezing rain, hail, etc.) intensity, precipitation amounts, precipitable water, direct normal irradiance (DNI), global horizontal irradiance (GHI), diffuse horizontal irradiance (DIF), and more.

In an example, the system includes one or more servers that are configured to detect weather features from satellite imagery and other unstructured sources and use local, national, and/or global weather predictions and local weather measurements to both generate modules of the weather forecast engine and to generate weather forecasts using the weather forecast engine modules. The system can also utilize historical data in the training of one or more modules for use by the weather forecast engine for weather forecasting.

Figure 1:
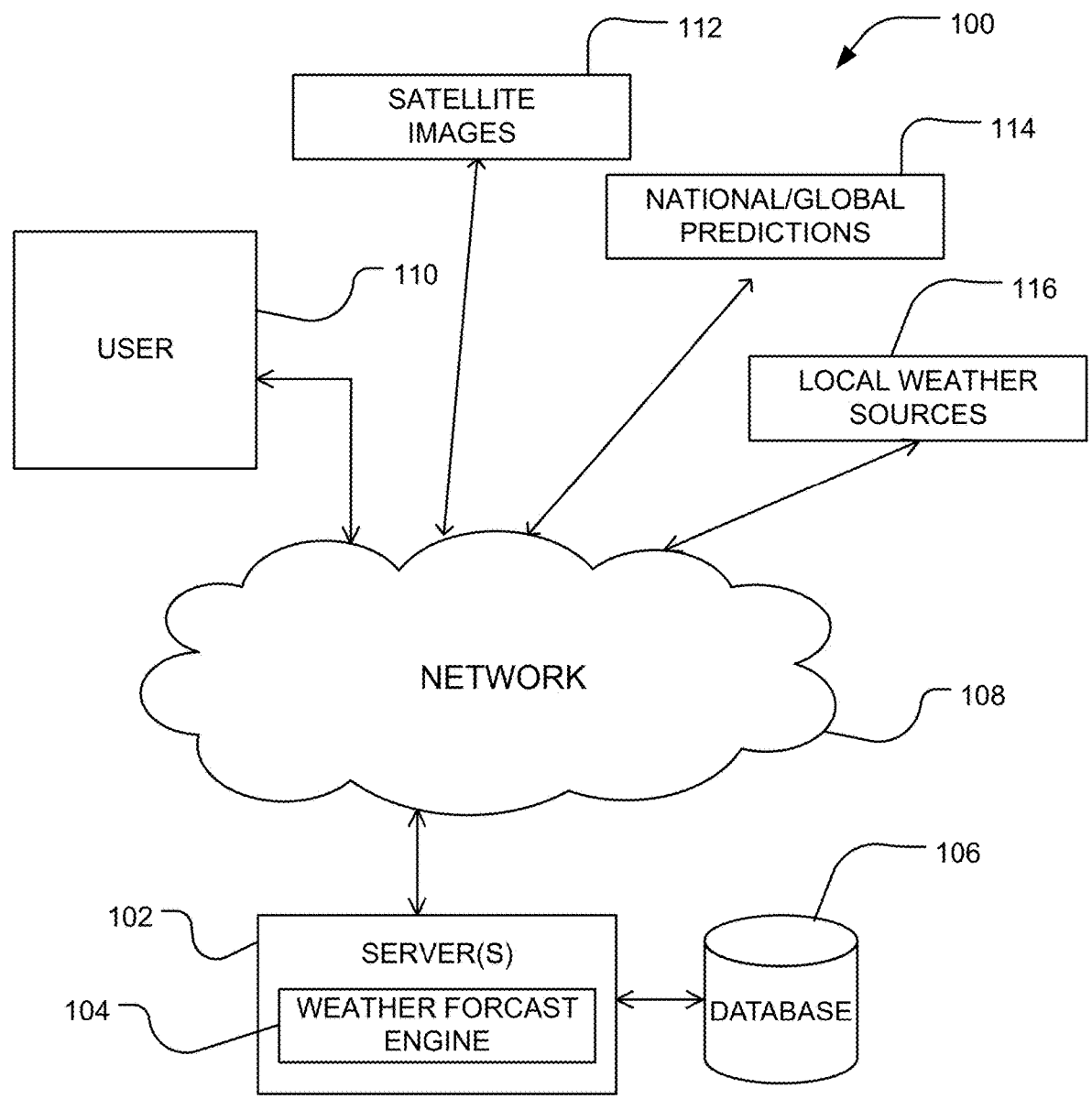
FIG. 1 illustrates an example system for forecasting weather.

For example, as illustrated in FIG. 1, a system 100 includes one or more servers 102 implementing a weather forecast engine 104. A database 106 can be accessed by the one or more servers 102. In the example, the database 106 includes historical weather measurements, imagery, and/or predictions, and can include weather-related information useful in training modules of the weather forecast engine.

The one or more servers 102 can be connected to a network 108 through which satellite images 112, national or global weather predictions 114, local weather information 116, or other weather-related images, indicators, data, or measurements can be acquired.

The network 108 can be a local area network (LAN), a wide area network (WAN), a global network (e.g., the Internet), or a virtual private network (VPN) implemented across one or more of a LAN, WAN, or global network. Optionally, the network 108 can include wired and wireless components. For example, the network 108 can be implemented using components such as ethernet, twisted-pair, or fiber-optic, or a wireless connection, such as wireless connections complying with IEEE 802.1x.x, such as Wi-Fi, WiMAX, Bluetooth, or any combination thereof.

In a particular example, the system 100 can obtain and process unstructured data 112 such as satellite imagery, satellite videos, maps, weather overlays, chart images, audio weather feeds, among other unstructured data, or any combination thereof, to generate modules of the weather forecasting engine 104. Further, national or global predictions 114, such as those published by national and international weather and oceanographic agencies, can be utilized in both training weather forecasting modules and forecasting using such modules. Similarly, local weather sources 116, such as local weather stations, airport weather feeds, distributed weather devices, weather buoys, or weather balloons, can be utilized in both generating modules and forecasting using such modules of the weather forecasting engine 104.

Unstructured data includes video data, image data, audio data, narrative text, or any combination thereof. Structured data has a relational structure in which identified variables are associated with a set of machine-readable values, e.g., numerical values, integer values, categories, Boolean values, etc., and combinations thereof. The values within the set of machine-readable values may be associated with a timestamp. As such, the association between variables and values in the structured data source is relatively simple.

In contrast, an unstructured data source requires significant processing to associate values with the variable. Further, the variable may not be readily identified from the unstructured data source. For example, a satellite image may include information regarding the amount of cloud cover, but quantification of the amount of cloud cover may require significant processing.

An unstructured data source may not include an association with a variable or value(s) associated with the variable and further may lack timestamp(s) associated with the value(s). As such, processing an unstructured data source can include identifying which variable to associate with the data source (e.g., cloud cover %), determining value(s) for the variable (e.g., numeric value(s) for % of cloud cover), and optionally extracting a timestamp associated with the value(s) from the unstructured data source.

The one or more servers 102 can be accessed by a user device 110 through the network 108. For example, the one or more servers 102 may offer a network-based interface, such as a browser-based interface or an application-based interface, so that the user device 110 can interact with the weather forecasting engine 104, e.g., can request forecasts from the weather forecasting engine 104 and display received forecasts.

In one embodiment, the weather forecast engine 104 can be distributed across multiple servers 102, using techniques known to one of ordinary skill in the art. The server(s) 102 can be any system on which the methods and/or techniques disclosed herein can be implemented. For example, the server(s) 102 may be server computers, desktop computers, laptop computers, tablets, smart phones, etc.

Figure 2:
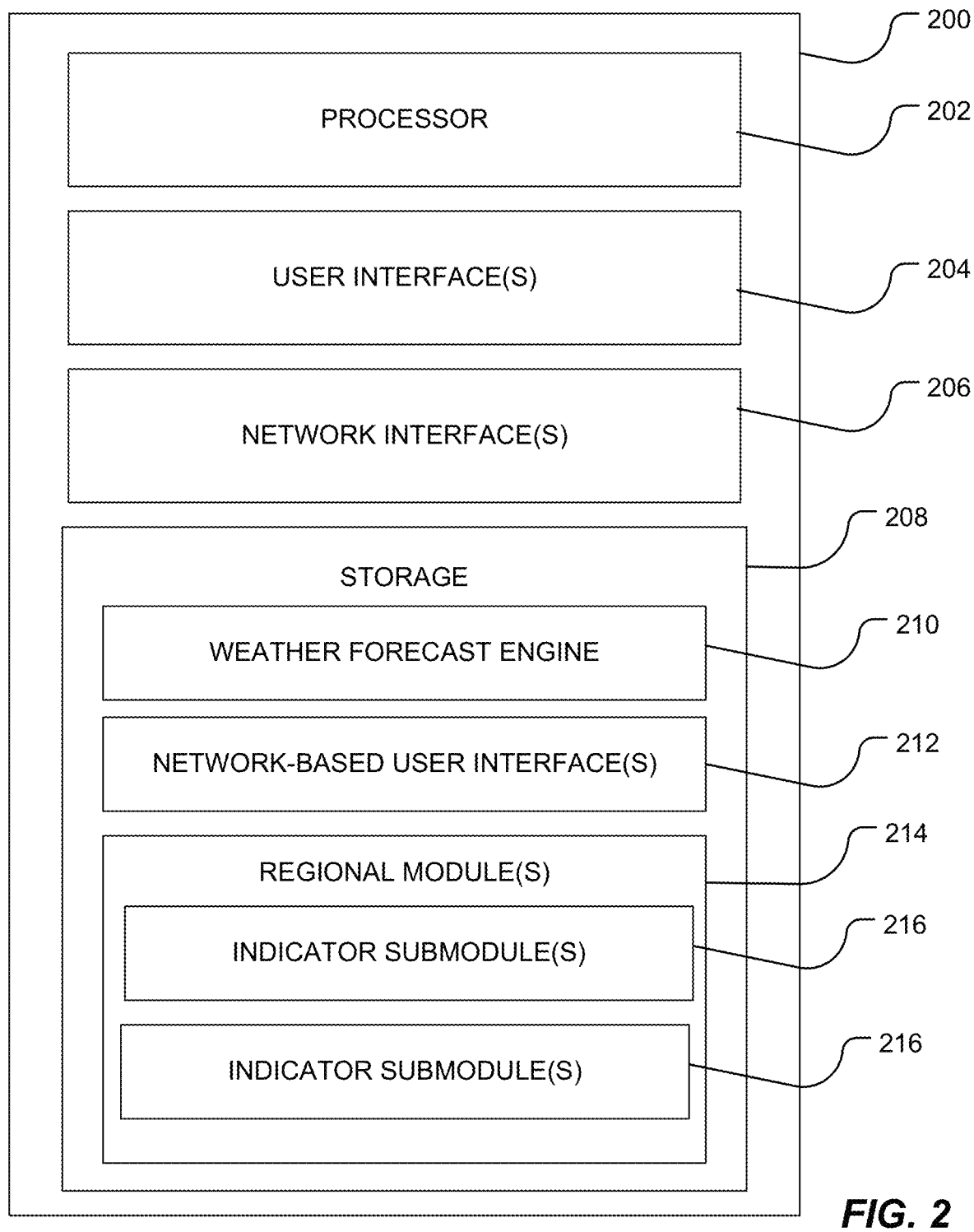
FIG. 2 illustrates an example computing device for generating weather forecasts.

As illustrated in FIG. 2, an exemplary server 200 can include a processor 202, user interface(s) 204 in communication with the processor 202, and network interface(s) 206 in communication with the processor 202.

The user interface(s) 204 can be utilized to provide data and instructions to be implemented by the processor 202. Example user interfaces 204 can include ports to which user interface devices are attached and can be wired or wireless. Example ports include universal serial bus (USB), high definition multimedia interface (HDMI), video graphics array (VGA), Bluetooth, digital video interface (DVI), Firewire, display port, or any combination thereof.

The network interface(s) 206 can be wired or wireless interfaces providing access to a local area network (LAN), a wide area network (WAN), a global network, or a virtual private network (VPN) implemented across one or more of a LAN, WAN, or global network. Optionally, the network interface(s) 206 can include components to access wired and wireless networks. For example, the network interface(s) 206 can be implemented using wired components such as ethernet, twisted-pair, or fiber-optic, or a wireless connection, such as wireless connections complying with IEEE 802.1x.x, such as Wi-Fi, WiMAX, Bluetooth, or any combination thereof.

Further, the computational system 200 can include storage 208 in communication with the processor 202. The storage can be implemented as random access memory (RAM), read-only memory (ROM), or long-term storage, or any combination thereof. The long-term storage can incorporate optical storage, magnetic storage, or solid-state storage, or any combination thereof. The storage 208 can include instructions and data to implement the functionality of the computational system.

The storage 208 can include a weather forecast engine 210, which can train modules and use such modules to forecast weather variables. Weather forecast engine 210 can utilize heuristics or algorithms to form regression models, Markov chains, time series models, state space models, Bayesian models, boosted decision trees, neural networks, convolutional neural networks, recurrent neural networks, or any other appropriate model, or any combination thereof. In an example, the weather forecast engine 210 can include trained neural network modules, such as long short-term memory (LSTM) neural networks or recurrent neural networks (RNNs).

In one embodiment, the weather forecast engine 210 can train regional modules 214. Regional modules 214 can be developed for different regions, e.g., regions around a particular city, etc. Different regions may have different lists and/or orderings of influential weather variables. For example, cities or regions proximal to an ocean can be more influenced by changing wind patterns throughout the day caused by differences in temperature on land and in sea than regions or cities disposed interior to the continent. On the other hand, humidity in interior regions may have greater variability and a bigger influence on weather conditions.

In addition, regional modules 214 can be developed with different objective functions that are directed to different weather variables. Additionally or alternatively, regional modules can incorporate submodules 216 that are developed with respect to objective functions for particular weather variables relative to other submodules. For example, a submodule for a particular regional module can be developed for the forecasting of solar irradiance, and another submodule can be developed for the forecasting of wind speed. As such, a company that is interested in a particular weather variable can use modules developed with respect to that variable, as they may be better predictors of the variable. For example, a solar energy company can use a module generated using an objective function that emphasizes accuracy of forecasting solar irradiance to determine expected output of solar power arrays. Also, a wind renewable energy company can use a module developed using an objective function that emphasizes accurate prediction of wind speed to determine expected energy output from a wind farm.

The storage 208 can further include instructions for implementing network-based user interfaces 212. For example, the network-based user interfaces 212 can be browser-based interfaces or application-based interfaces served to a user device over a network that permits the user to interact with the weather forecast engine 210.

Figure 3:
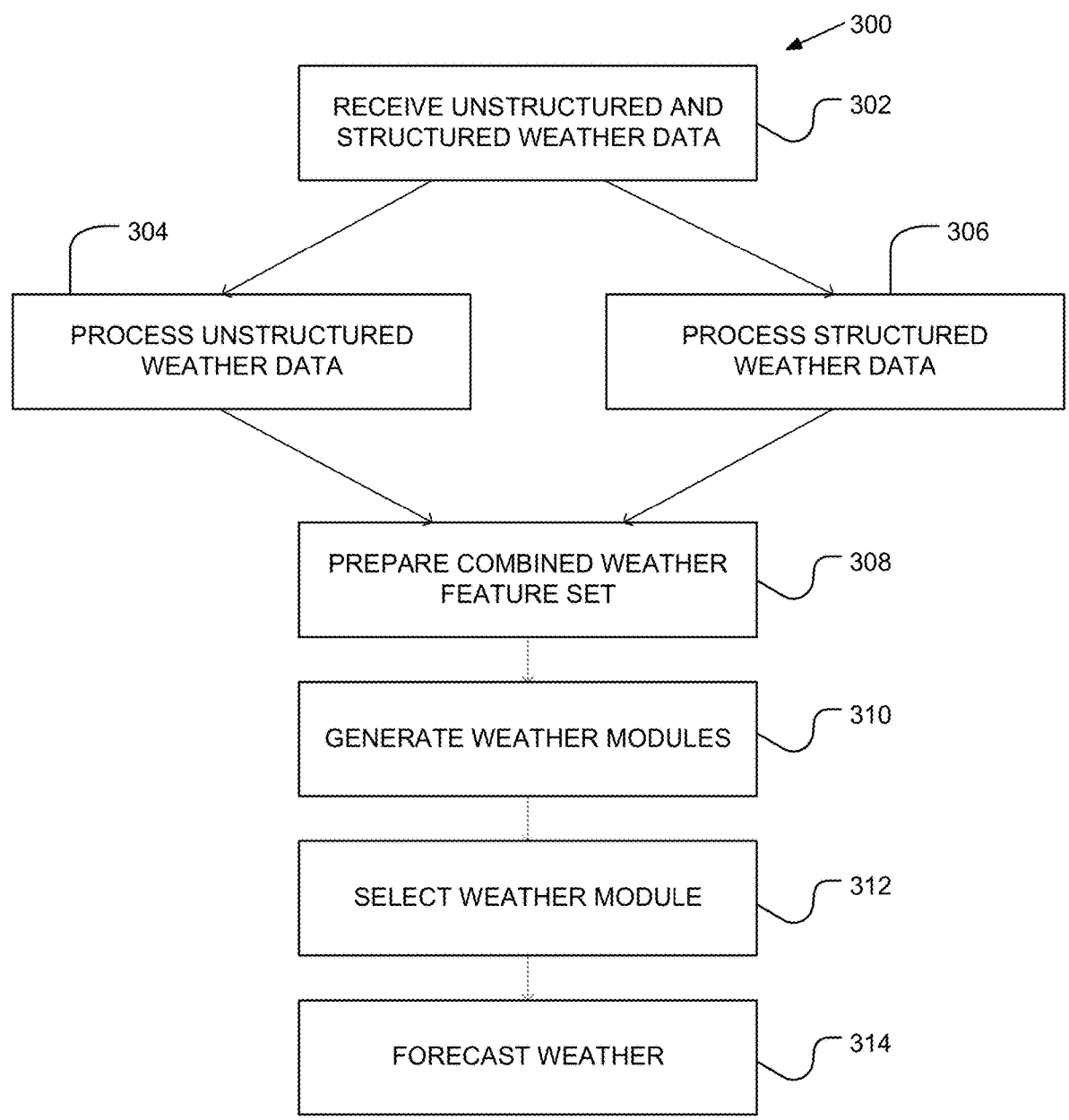
FIG. 3 illustrates an example method for preparing and using weather forecasting modules.

FIG. 3 illustrates a method 300 for forecasting a weather condition according to one aspect of the present disclosure. As illustrated at step 302, the system receives unstructured and structured historical weather data.

As illustrated at step 304, the unstructured weather data can be processed. For example, image processing techniques and/or computer vision methods can be utilized to generate structured data from satellite imagery, map overlays, images of charts, and other image- or video-based unstructured data to determine features such as cloud cover (the % of an image with clouds), cloud density, cloud movement speed, cloud movement direction, water vapor %, relative or absolute humidity, clear sky ratio, cloud type (e.g., cirrus, cumulus, stratus, etc.), etc.

The unstructured data may be narrative text such as an RSS feed or narrative text announcements made by weather bureaus. Artificial intelligence techniques, e.g., natural language processing, can be utilized to process narrative text to convert the text into a structured data format with variables and associated values.

The unstructured data may be audio such as weather broadcasts. Such unstructured audio data may be analyzed using audio processing techniques to convert the audio into a structured data format with variables and associated values.

As illustrated at step 306, structured weather data such as temperature, barometric pressure, wind speed, wind direction, solar irradiance, dew point, absolute or relative humidity, precipitable water, among others, can be processed. For example, data may be extracted, formatted, and cleaned.

As illustrated at step 308, a combined weather feature set can be prepared, for example, utilizing structured data generated from the processed unstructured weather data and the formatted and cleaned structured weather data.

As illustrated at step 310, weather modules can be generated utilizing the combined weather feature set. Weather forecast engine 210 can generate modules utilizing heuristics or algorithms to form regression models, Markov chains, time series models, state space models, Bayesian models, boosted decision trees, neural networks, or any other appropriate model, or any combination thereof. In an example, the modules can include trained neural network modules, such as modules taking the form of long short-term memory (LSTM) units or recurrent neural network units.

The specific heuristics, algorithms, and/or types of neural network to be used for any particular module may be selected based on the type of input data, and/or the historical success of using the heuristics, algorithms, or neural networks. Any required hyperparameters (e.g., numbers of layers, size of layers, number of nodes, number of hidden units, activation function, learning rate, momentum, etc.), for the heuristics, algorithms, and/or neural networks may be similarly selected.

After the heuristics, algorithms, and/or neural networks are selected, they may be trained based on historical weather data. Multiple models may be generated and trained, and a best fit model may be selected from the multiple trained models to be used in the weather module.

In one embodiment, regional weather modules can be generated for specific regions, such as areas proximal to a particular city or areas proximal to a particular facility. Regions may include areas around solar farms, wind farms, and/or oceanographic stations. Such modules can be further differentiated based on the objective function utilized in generating the modules. For example, a module can be generated for a city that is generated based on an objective function that predicts solar irradiance. Another module for the city may predict wind speed, whereas further modules may predict temperature or humidity.

In one embodiment, weather modules, including regional modules, can be generated for specific times of year, e.g., specific months, seasons, etc. For example, a module can be generated for a specific city in January, or in the winter. Weather patterns can change based on the month or season.

In one embodiment, weather modules, including regional modules and month/season-specific modules, can be generated to forecast weather a specific time in the future. For example, module(s) can be generated to determine 3-hour, 6-hour, 12-hour, 18-hour, 24-hour, 2-day, 3-day, etc., forecasts.

As illustrated at step 312, when seeking to forecast a particular weather variable, a weather forecasting module may be selected based on the region and the desired variable. Weather measurements and other data relevant to the current atmospheric conditions can be applied to the selected weather module to forecast the weather variable, as illustrated at step 314.

Figure 4:
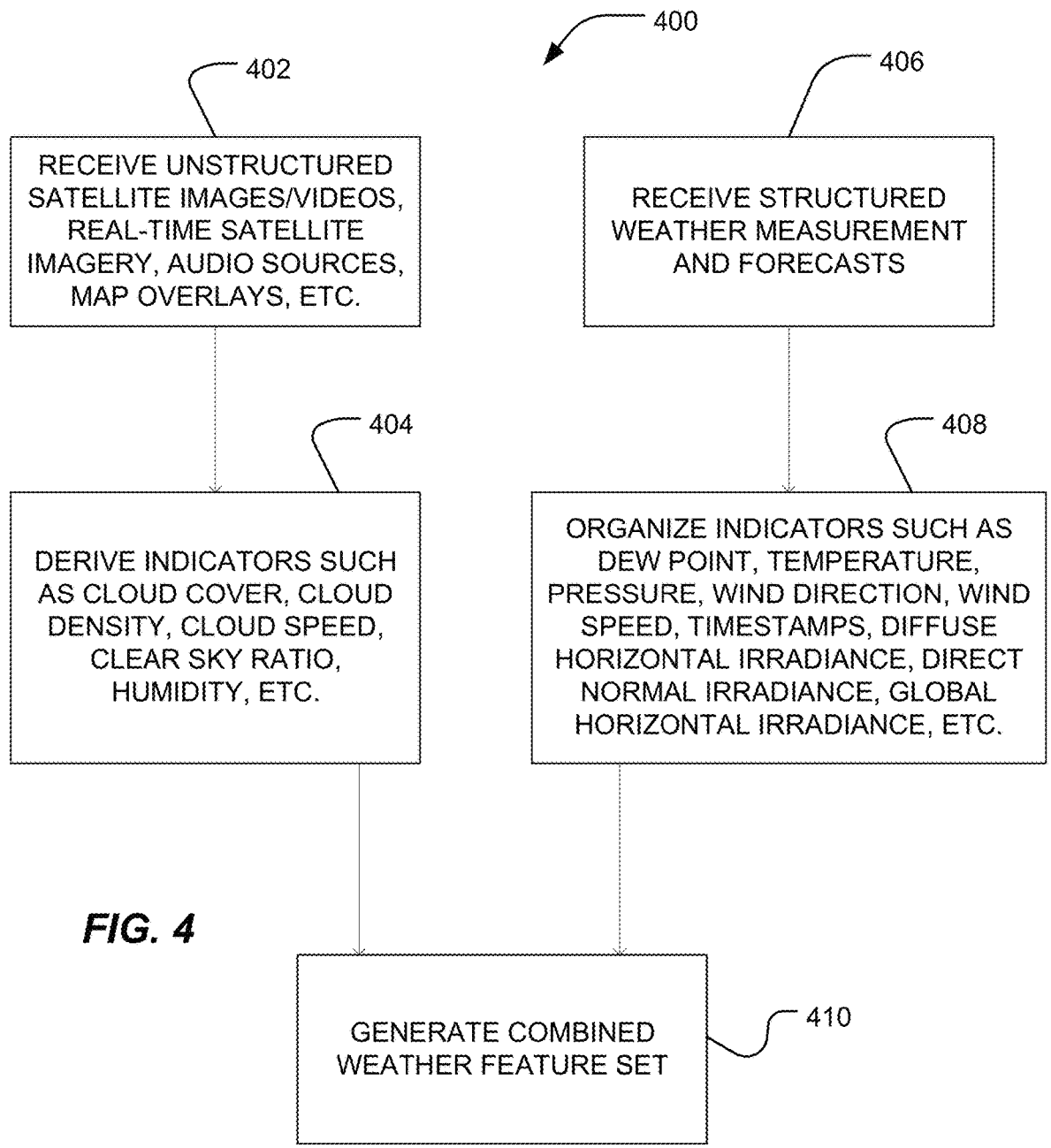
FIG. 4 illustrates another example method for preparing and using weather forecasting modules.

In a particular example illustrated in FIG. 4, a method 400 includes receiving unstructured satellite images or videos, real-time satellite imagery, audio sources (such as weather broadcasts), map overlays, RSS feeds and/or narrative text announcements by weather bureaus, and/or other unstructured data, as illustrated at step 402. From the unstructured data, weather indicators and/or variables can be derived such as cloud cover, cloud density, cloud speed, cloud movement direction, clear sky ratio, humidity, etc., as illustrated at step 404.

Figure 8:
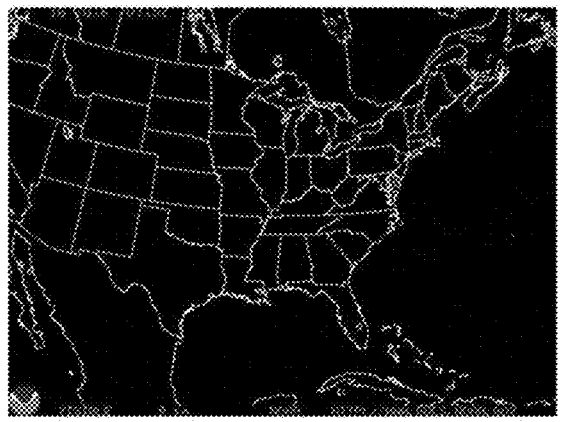
FIG. 8 and FIG. 9 illustrate examples of multispectral satellite imagery.
Figure 9:
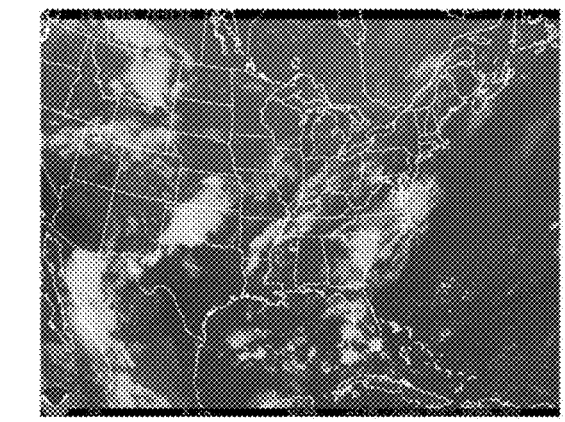

Satellite imagery can be processed through various image processing techniques to generate indicators and/or variables associated with the weather. For example, multispectral satellite imagery can be processed to generate weather variables. Multispectral satellite imagery is updated every 15 minutes in the United States and similarly in other countries. Often, these images are broadcast in a loop to create a video. Example multispectral images, showing cloud cover across the United States, are illustrated in FIG. 8 and FIG. 9.

Figure 10:
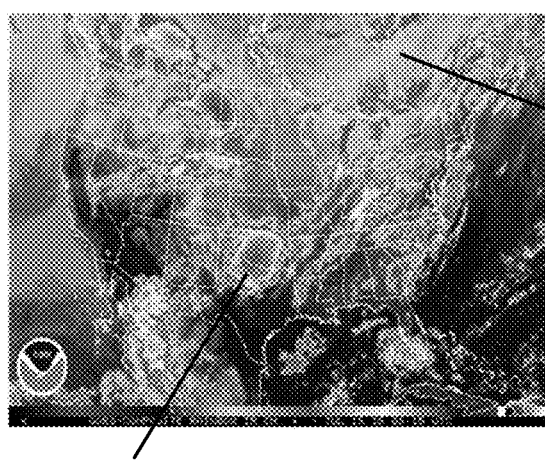
FIG. 10 and FIG. 11 illustrate examples of satellite imagery with overlays of weather variables.
Figure 11:
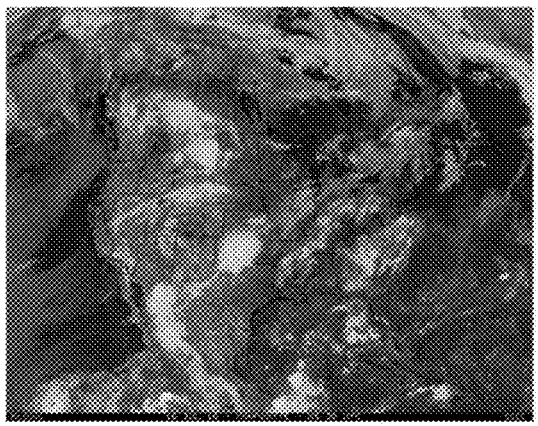

The satellite imagery may include overlays indicative of weather patterns, as illustrated in FIG. 10 and FIG. 11. FIG. 10 illustrates an infrared satellite image, which includes special color enhancements that help in identifying areas that have high-altitude cloud cover versus areas with low-altitude cloud cover. In general, the color overlay shows lower altitude (warmer) clouds 1002 as blue and/or green and higher altitude (cooler) clouds 1004 as various shades of yellow, red, and purple. Various other color schemes may be used. The satellite feeds help in identifying the areas that have significantly taller clouds, which often correlate with more active weather systems.

Figure 12:
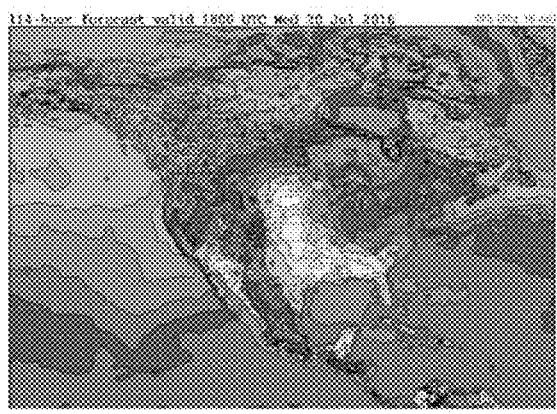
FIG. 12 and FIG. 13 illustrate examples of satellite imagery with overlays of weather forecasts.
Figure 13:
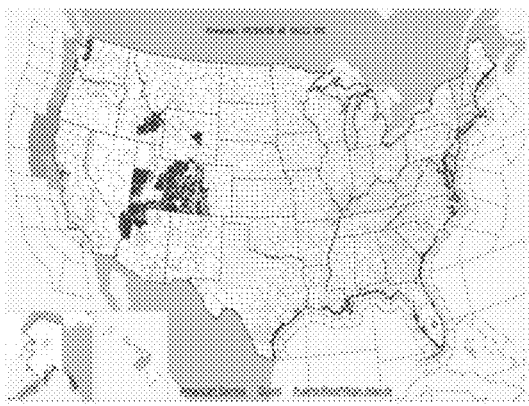

Further, forecasts based on various weather models and outputs can be broadcast or published by conventional weather services. For example, as illustrated in FIG. 12, a map overlay with iso-lines indicative of forecast values of pressure, temperature, humidity, etc., may be processed from an image. In another example illustrated in FIG. 13, particular weather events (e.g., thunderstorm watches, warnings, etc.) can be highlighted (based on a respective color code) on a map of a country, state, region, etc.

In another example, water vapor satellite feeds can be analyzed to determine water vapor percentages. These feeds use wavelengths that are highly sensitive to the moisture content in the atmosphere. These feeds also use color enhancements to differentiate between the high, less, and no moisture content areas, e.g., deep blue and white areas may indicate high moisture content areas and areas indicated by dark orange and brown may represent areas with little or no moisture.

Once images are obtained, they can be segmented into smaller sections, and from each segment in the target area any enhanced color codes can be extracted and used to determine weather-related features. For instance, in the infrared cloud maps illustrated in FIG. 10, areas with high cloud density and tall clouds 1004 are represented by yellow and orange color enhancements, whereas the areas that have low altitude clouds 1002 are represented by green and blue colors. Similarly, water vapor and moisture data can be extracted from water vapor maps by recognizing blue and white as indicating high moisture content and dark orange and brown as indicating low moisture content. Accordingly, various weather imagery can be analyzed to determine weather variables.

Figures 16, 17, 18:
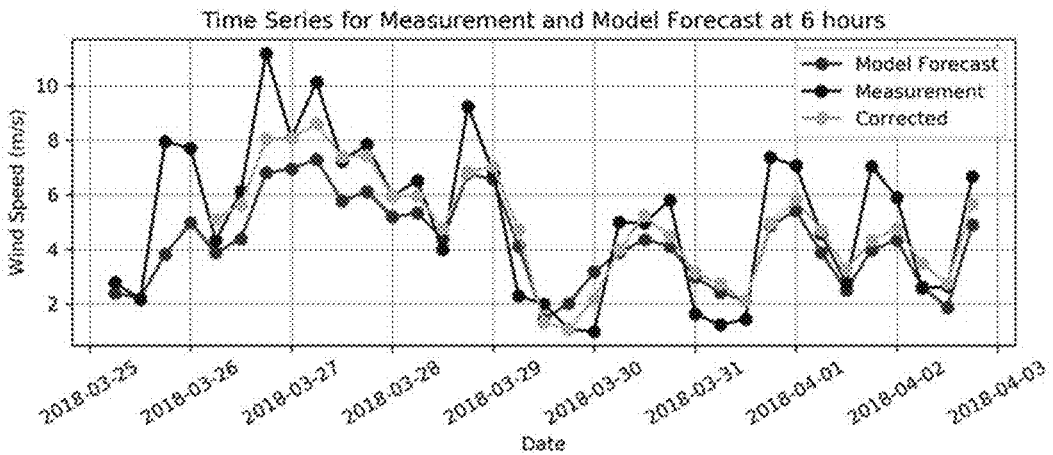
FIG. 16 and FIG. 17 illustrate examples of narrative text from which weather variables can be extracted.
FIG. 18, FIG. 19, FIG. 20, and FIG. 21 illustrate corrected forecasts using error correction modules.
Figure 19:
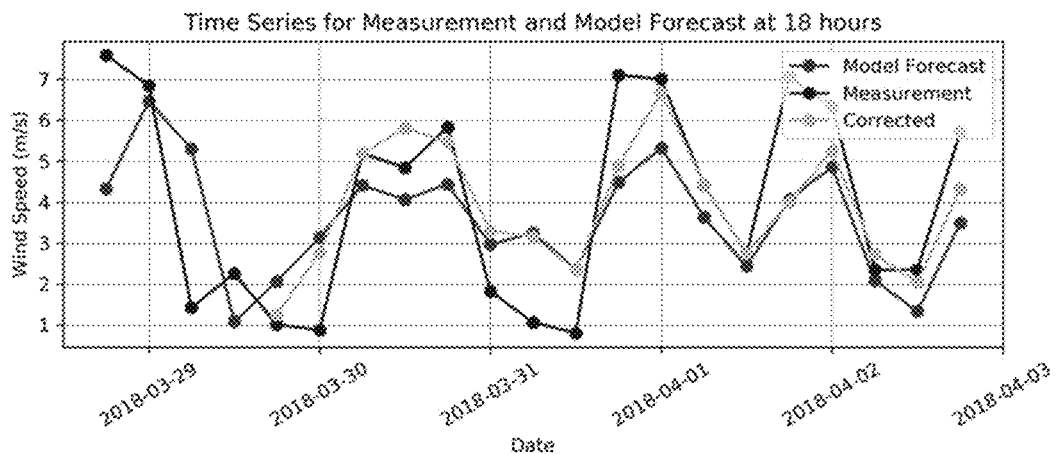

Narrative text may be processed using various techniques, e.g., artificial intelligence, natural language processing, etc., to derive structured data from announcements, newsfeeds, or various warnings provided by different weather services. As illustrated in FIG. 16 and FIG. 17, various messages provided by weather services can include data that can be extracted. FIG. 16 illustrates a message from the Global Forecast System (GFS). FIG. 17 illustrates a message from NOAA including data regarding a tropical cyclone, in this case, Hurricane Patricia. The message includes data regarding time (A), position (B), wind speed and direction (D, E, F, and G), pressure (H), temperature (I, J), dewpoint (K), structure of the eyewall (L, M), and other data, all of which may be extracted using language processing techniques.

Audio data may be processed using various techniques, e.g., artificial intelligence, audio signal processing, etc., to derive structured data from audio weather broadcasts provided by different weather services.

Figures 14, 15:
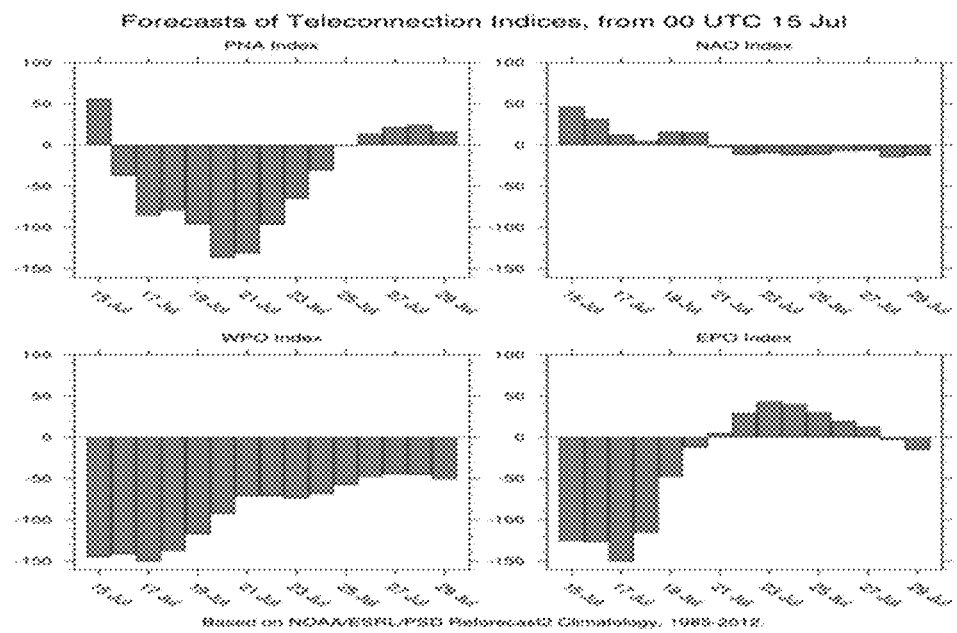
FIG. 14 and FIG. 15 illustrate examples of structured weather data.

The system can also receive structured weather data, e.g., weather measurements and forecasts, as illustrated at step 406. The structured weather data can include variables and/or indicators useful for particular models or modules, as illustrated at step 408. For example, structured data such as indices, as illustrated in FIG. 14, or reports, as illustrated in FIG. 15, can be provided in the form of a database, a table, a chart, a spreadsheet, etc., from which variables and/or indicators such as dewpoint, temperature, pressure, wind direction, wind speed, diffuse horizontal irradiance, direct normal irradiance, global horizon irradiance, etc., can be extracted.

The weather variables derived from unstructured data and the variables extracted from structured data can be combined into a weather feature set, as illustrated at step 410. Such a feature set can be used to generate modules for use by the weather forecast engine and/or as input of a present state to be applied to a module to generate a forecast. As discussed above, different variables may have different levels of importance in forecasting variables in different regions. In one embodiment, the feature set can be normalized according to time intervals, vertical levels (e.g., height), averaged time periods, and/or units of measurements.

Figure 5:
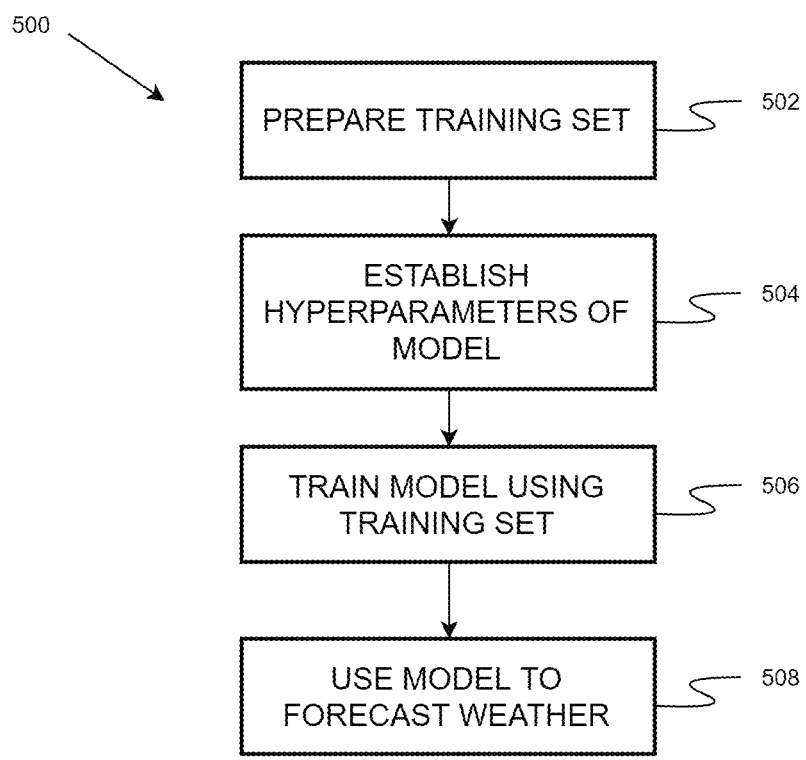
FIG. 5 illustrates an example method for generating a weather forecasting module that comprises a neural network.

FIG. 5 illustrates an example method 500 for generating a weather forecasting module based on the combined weather set. In this example, the module uses a neural network model, such as a long short-term memory (LTSM) neural network model, though other types of models may be used. In step 502, historical data from the combined weather feature set can be used to prepare training sets. For example, training sets can be established to train for predictions of different periods such as 6 hours, 12 hours, 24 hours, seven days, etc. Such times are examples and other lengths of time can be used.

Each training set may comprise one or more input data points and an output data point, both from the historical data. The input data points may be a time series of data points occurring a prediction period (e.g., 6 hours, 12 hours, 24 hours, seven days, etc.) prior to the time of the output data point. For example, if the historical data includes 10 days of measurement data, and the data is normalized to 1 hour increments, a total of 240 data points may be provided. If an 10-hour window is used for the measurement data (training input), and the prediction period is 6 hours, each training record will comprise a series of 10 input data points (e.g., data points 1-10, data points 2-11, etc.) and an output data point 6 hours later (e.g., data point 16, data point 17, etc.). Thus, using a 10-hour window, and a 6-hour prediction period, 240 initial data points results in 225 total training records that may be used to train the model.

The training sets may comprise a single weather variable, e.g., cloud cover, so that the resulting model would be able to accurately forecast cloud cover using only prior cloud cover data as inputs. Alternatively, the inputs values of the training sets may comprise multiple variables, so that the resulting model can forecast a weather variable, e.g., cloud cover, using multiple variables as input.

In step 504, the hyperparameters of the model can be established, including the number of layers and neurons, the number of epochs (e.g., complete passes through the training set), optimizations, error functions, etc.

In step 506, the model may be trained using the training set prepared in step 502.

After the model is generated, the model can then be incorporated into a weather forecasting module, which may be utilized for forecasting of weather and/or atmospheric conditions as illustrated at step 508.

Figure 6:
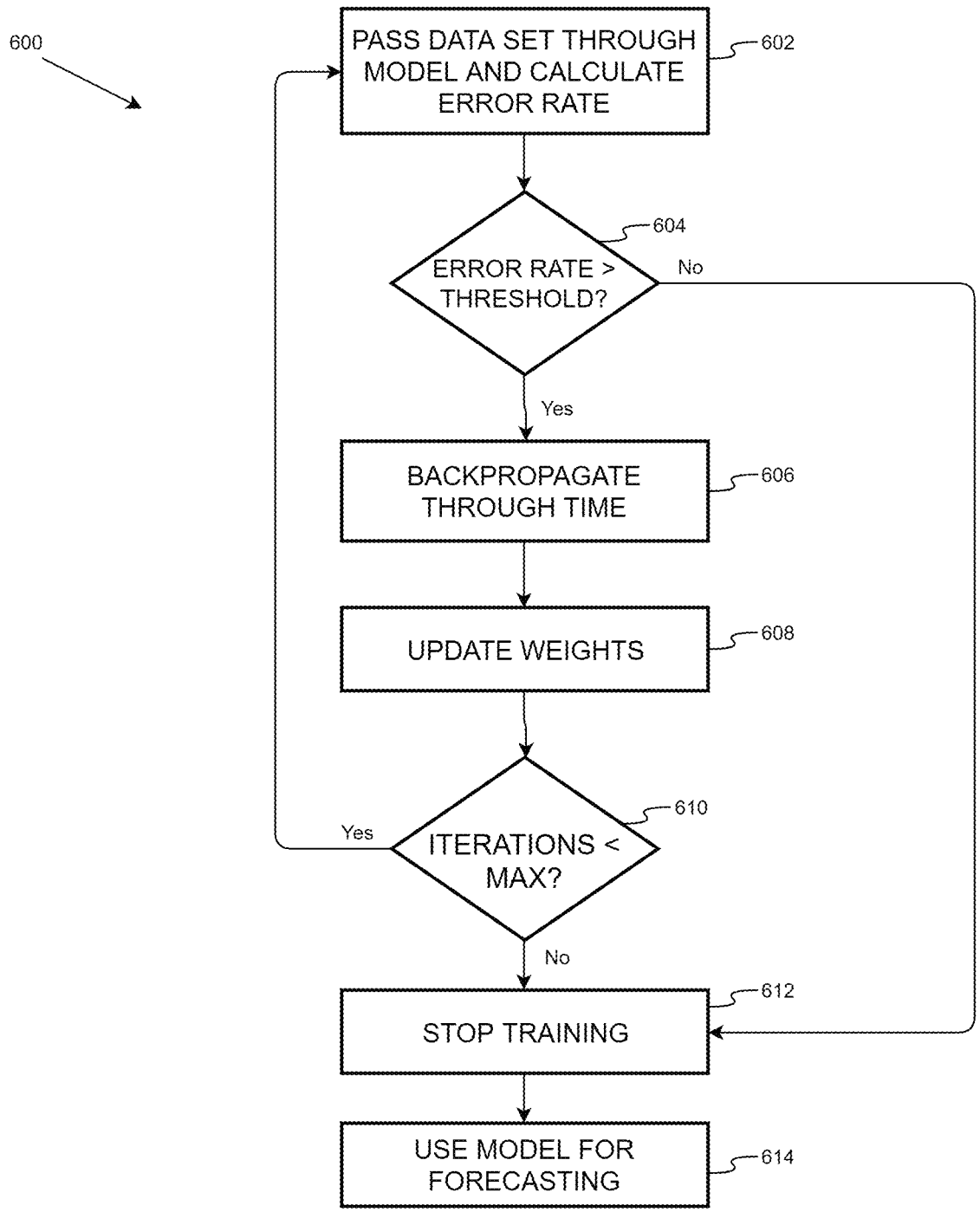
FIG. 6 illustrates an example method for training a neural network.

FIG. 6 illustrates one embodiment 600 of training a model (see FIG. 5 at step 506). In step 602, the data set is passed through the model, and an error rate as compared to a target output is determined.

In step 604, the error rate is compared to a threshold. If the error rate is not less than (i.e., greater than) the threshold, backpropagation through time may be used to calculate gradients for the connections between the neurons, as illustrated at step 606. In step 608, weights within the neural network can be updated based on the calculated gradients.

In step 610, the number of iterations is compared to a maximum number (e.g., the predetermined number of epochs), and if it has not been reached, the method returns to step 602 to perform another training iteration. Once the maximum number of iterations has been hit or the error threshold has been achieved, the training can stop in step 612, and the model can then be used for forecasting, as illustrated at step 614.

The inputs used for the model may be determined by one or more data analysis methods, such as identifying input variables that influence the desired output, identifying input variables that influence other input variables, etc.

Figure 22:
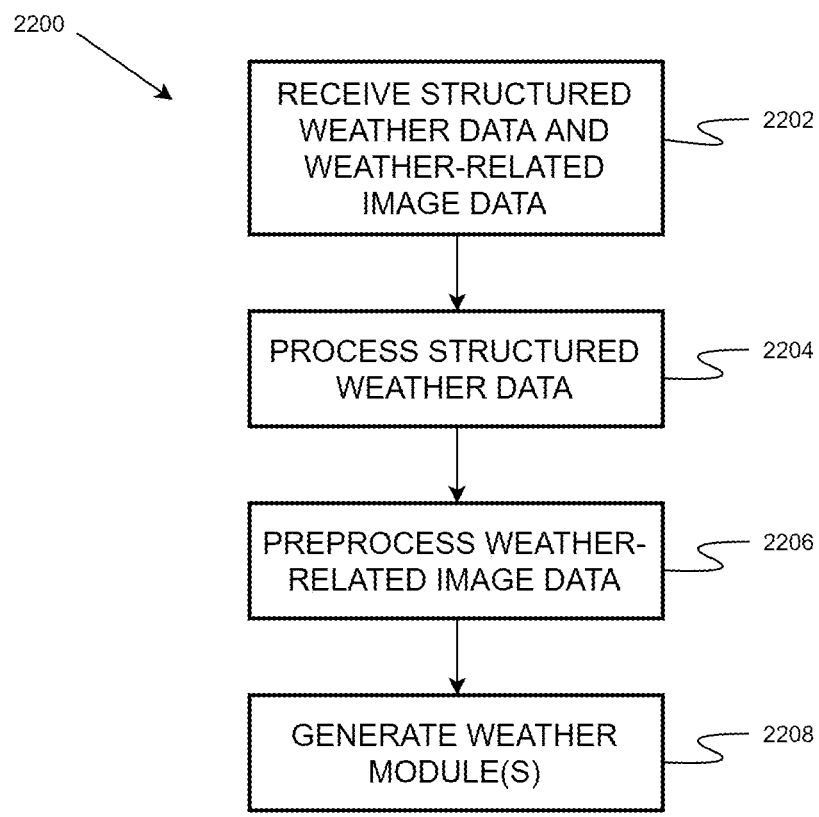
FIG. 22 illustrates an alternative method for generating a weather forecasting module.

An alternative embodiment, in which weather-related image data is directly processed by one or more neural networks, is illustrated in FIG. 22. FIG. 22 illustrates a method 2200 for creating a module for forecasting a weather condition according to one aspect of the present disclosure. As illustrated at step 2202, the system receives historical weather-related image data and structured historical weather data.

As illustrated at step 2204, the structured weather data, e.g., temperature, barometric pressure, wind speed, wind direction, solar irradiance, dew point, absolute or relative humidity, precipitable water, among others, can be processed. For example, data may be extracted, formatted, and cleaned.

As illustrated at step 2206, the weather-related image data (e.g., satellite image data, map overlays, images of charts, etc.) is cropped, resized, and/or preprocessed. In one embodiment, the weather-related image data may be cropped to focus in on a region of interest. The weather-related image data may also be resized to fit the expected input size. If necessary, weather-related images may be aligned with each other.

In one embodiment, the weather-related image data may be normalized or standardized. Images can be standardized by, e.g., for each color channel, subtracting the mean of the values of the color channel from each value and dividing by the standard deviation. In an alternative embodiment, images can be normalized by, for each color channel, dividing each value by the maximum value for the channel.

In one embodiment, the satellite image data is preprocessed to enhance certain image features, for example, by running the image data through one or more filters, e.g., edge detection filters, sharpening filters, etc. In embodiments where preprocessing is not necessary, the preprocessing step may be skipped.

As illustrated at step 2208, weather modules can be generated utilizing the structured weather data and the preprocessed image data. Weather forecast engine 210 can generate modules utilizing heuristics or algorithms to form regression models, Markov chains, time series models, state space models, Bayesian models, boosted decision trees, neural networks, or any other appropriate model, or any combination thereof.

The specific heuristics, algorithms, or types of neural networks to be used for any particular module may be selected based on the type of input data, and/or the historical success of using the heuristics, algorithms, or neural networks. Any required hyperparameters (e.g., numbers of layers, size of layers, number of nodes, number of hidden units, activation function, learning rate, momentum, etc.), for the heuristics, algorithms, or neural networks may be similarly selected.

In one embodiment, the modules can include one or more trained neural network models, for example, recurrent neural network models (e.g., RNNs, LSTMs, GRUs, etc.), convolutional neural networks, etc. Multiple neural network models may be connected together, e.g., the output of one neural network model may be used as the input of another neural network model. For example, the image data may be processed by a model adapted for processing image data (e.g., a convolutional neural network), and the structured data, in combination with the output of the model processing the image data, may be processed by a second model adapted to process such data to generate a weather forecast.

Figure 23:
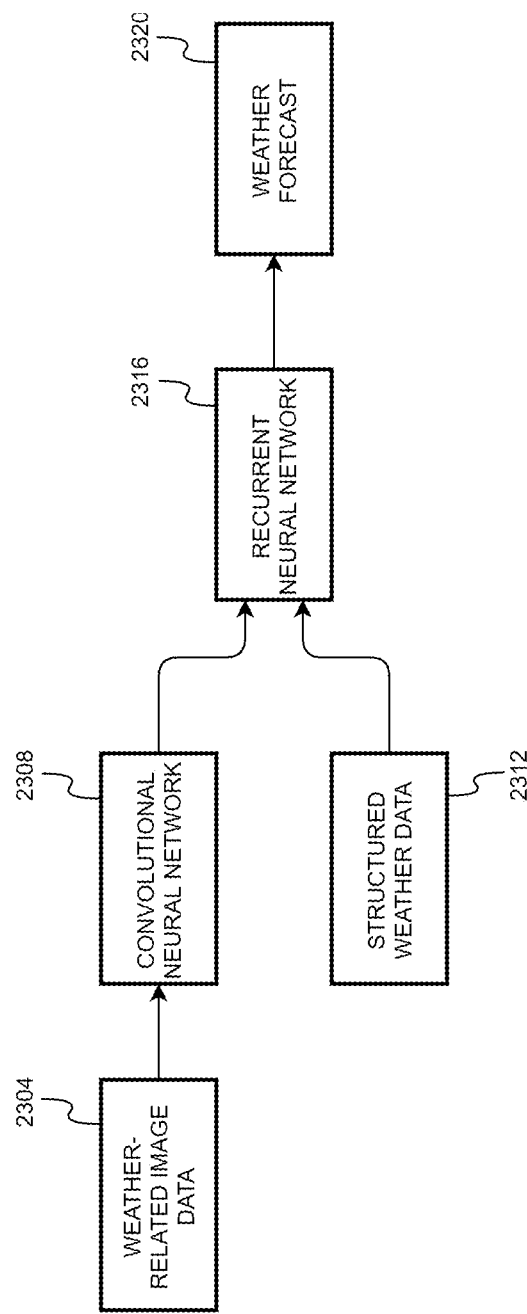
FIG. 23 illustrates an example model that may be generated by the method illustrated in FIG. 22.

In one particular embodiment, the model, illustrated in FIG. 23, includes a convolutional neural network 2308 connected to a recurrent neural network (e.g., RNN, LSTM, GRU, etc.) 2316. In use, the preprocessed image data 2304 is input into the convolutional neural network 2308. The output of the convolutional neural network 2308 is input to the recurrent neural network 2316, along with the processed structured weather data 2312. The output of the recurrent neural network is used as the forecast 2320 for the desired weather variable. In some embodiments, the output of the recurrent neural network is processed further to generate the forecast. Instead of a convolutional neural network, another type of neural network may be used to process the image data, e.g., a recurrent neural network, a stacked neural network, a deep neural network, etc.

After the heuristics, algorithms, or neural networks are selected, training data sets may be generated, and the models may be trained based on training data sets as described with respect to FIG. 6. Multiple models may be generated and trained, and a best fit model may be selected from the multiple trained models to be used in the weather module.

In one embodiment, regional weather modules can be generated for specific regions, such as areas proximal to a particular city or areas proximal to a particular facility. Regions may include areas around solar farms, wind farms, and/or oceanographic stations. Such modules can be further differentiated based on the objective function utilized in generating the modules. For example, a module can be generated for a city that is generated based on an objective function that predicts solar irradiance. Another module for the city may predict wind speed, whereas further modules may predict temperature or humidity.

In one embodiment, weather modules, including regional modules, can be generated for specific times of year, e.g., specific months, seasons, etc. For example, a module can be generated for a specific city in January, or in the winter. Weather patterns can change based on the month or season.

In one embodiment, weather modules, including regional modules and month/season-specific modules, can be generated to forecast weather a specific time in the future. For example, module(s) can be generated to determine 6-hour, 12-hour, 18-hour, 24-hour, etc., forecasts.

When seeking to forecast a particular weather variable, a weather forecasting module may be selected or generated based on the region and the desired variable. Weather measurements, satellite images, and other data relevant to the current atmospheric conditions of the region can be input to the selected weather module to forecast the weather variable.

The improved weather forecasts provided by the disclosed system are usable by multiple industries, including power generation, insurance, retail operations, airlines, etc. For example, weather-dependent power generators, e.g., wind farms and solar power plants, can use the disclosed methods to create more accurate short-term power output forecasts. With historical weather data, particularly winds for wind farms and solar radiation for solar power plants, and historical power generation output, an algorithm, e.g., machine learning algorithm, regression algorithm, or other algorithm as described herein, can be trained to predict power output from weather input data. The trained model can then be used to forecast short-term power plant production output from a weather forecast.

Figure 24:
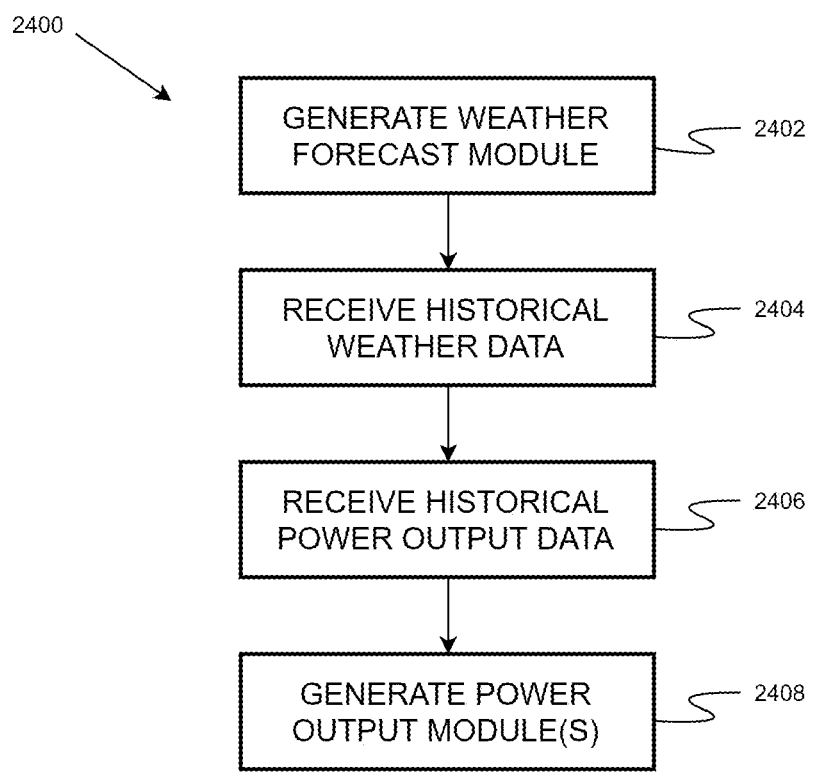
FIG. 24 illustrates a method for generating a power output forecast module.

An example method 2400 for generating a power output forecast is illustrated in FIG. 24. In step 2402, a weather forecast module is generated as described with respect to one or more of FIGS. 3, 4, 5, 6, and 22. Alternatively a previously-generated weather forecast module may be used.

In step 2404, historical weather data is received. The weather data may be structured weather data, unstructured weather data, or a combination of structured weather data and unstructured weather data. The weather data may include some of the weather data used to generate the weather forecast module, or it may be different weather data. If the historical weather data includes unstructured weather data, the unstructured weather data may be processed as described herein to generate structured weather data. If the historical weather data includes both structured and unstructured weather data, a combined weather feature set may be generated as described herein.

In step 2406, historical power generation data is received. The power generation data may be formatted, cleaned, or otherwise preprocessed for input to an algorithm. With respect to wind farms, this data may include wind turbine data, e.g., wind turbine locations, turbine performance data, turbine age, turbine specifications (e.g., capacity, hub height, rotor diameter, total height, manufacturer and model, etc.), etc.

In step 2408, power output forecast modules can be generated based on the historical weather and power generation data. Modules can be generated using heuristics or algorithms to form regression models, Markov chains, time series models, state space models, Bayesian models, boosted decision trees, neural networks, or any other appropriate model, or any combination thereof.

The specific heuristics, algorithms, or types of neural networks to be used for any particular power output module may be selected based on the type of input data, and/or the historical success of using the heuristics, algorithms, or neural networks. Any required hyperparameters (e.g., numbers of layers, size of layers, number of nodes, number of hidden units, activation function, learning rate, momentum, etc.), for the heuristics, algorithms, or neural networks may be similarly selected.

After the heuristics, algorithms, or neural networks are selected, training data sets may be generated, and the power output models may be trained based on training data sets as described with respect to FIG. 6. Multiple models may be generated and trained, and a best fit model may be selected from the multiple trained models to be used in the power output forecast module.

Weather plays an important role in predicting electrical load. The techniques described herein can be used to generate more accurate electrical load forecasts. The weather forecasts (e.g., the chance of rain and/or sandstorms, wind speeds, etc.) can be combined with other power-related parameters to generate next 5 minute to hourly load forecasts for a period of up to 7 days.

Figure 25:
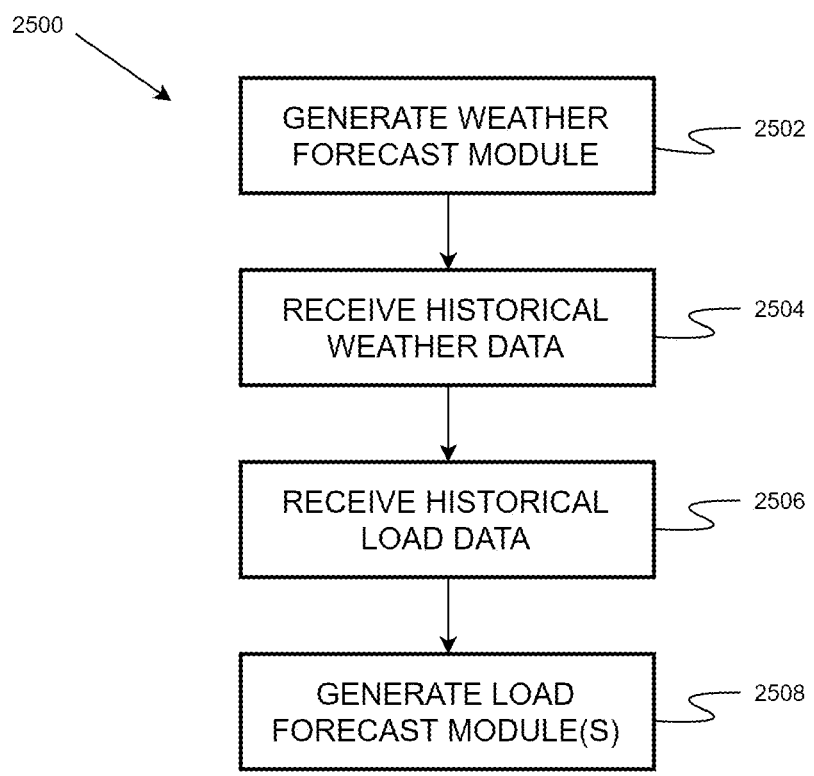
FIG. 25 illustrates a method for generating an electrical load forecast module.

An example method for generating an electrical load forecast is illustrated in FIG. 25. In step 2502, a weather forecast module is generated as described with respect to one or more of FIGS. 3, 4, 5, 6, and 22. Alternatively a previously-generated weather forecast module may be used.

In step 2504, historical weather data is received. The weather data may be structured weather data, unstructured weather data, or a combination of structured weather data and unstructured weather data. The weather data may include some of the weather data used to generate the weather forecast module, or it may be different weather data. If the historical weather data includes unstructured weather data, the unstructured weather data may be processed as described herein to generate structured weather data. If the historical weather data includes both structured and unstructured weather data, a combined weather feature set may be generated as described herein.

In step 2506, historical electrical load data is received. The electrical load data may be formatted, cleaned, or otherwise preprocessed for input to an algorithm.

In step 2508, load forecast modules can be generated based on the historical weather and electrical load data. Modules can be generated using heuristics or algorithms to form regression models, Markov chains, time series models, state space models, Bayesian models, boosted decision trees, neural networks, or any other appropriate model, or any combination thereof.

The specific heuristics, algorithms, or types of neural networks to be used for any particular load forecast module may be selected based on the type of input data, and/or the historical success of using the heuristics, algorithms, or neural networks. Any required hyperparameters (e.g., numbers of layers, size of layers, number of nodes, number of hidden units, activation function, learning rate, momentum, etc.), for the heuristics, algorithms, or neural networks may be similarly selected.

After the heuristics, algorithms, or neural networks are selected, training data sets may be generated, and the load forecast models may be trained based on training data sets as described with respect to FIG. 6. Multiple models may be generated and trained, and a best fit model may be selected from the multiple trained models to be used in the load forecast module.

In addition, power grid operators need a high degree of accuracy in their forecasts to optimize grid assets and plan for outage events. In forecasting wind speeds and sandstorms, the techniques described herein can help flag areas of potential hazard to plan for rerouting of power or backup generation as necessary. By understand the mix of power, and the amount of wind or solar generation that will be expected, grid operators can help suppliers optimize dispatchable assets to cut down on wasted energy.

Figure 26:
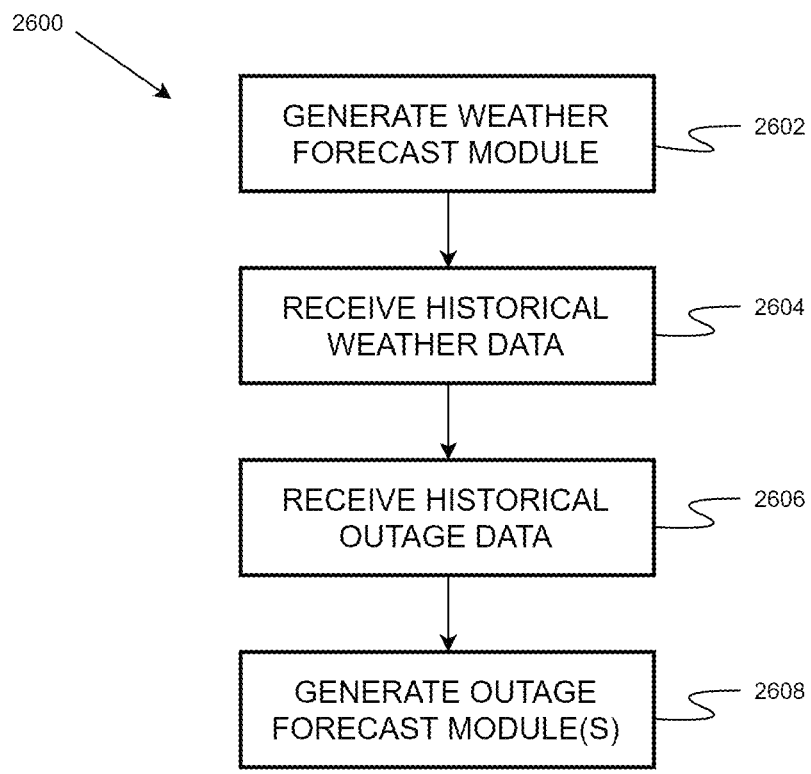
FIG. 26 illustrates a method for generating a power outage forecast module.

An example method for generating an outage forecast is illustrated in FIG. 26. In step 2602, a weather forecast module is generated as described with respect to one or more of FIGS. 3, 4, 5, 6, and 22. Alternatively a previously-generated weather forecast module may be used.

In step 2604, historical weather data is received. The weather data may be structured weather data, unstructured weather data, or a combination of structured weather data and unstructured weather data. The weather data may include some of the weather data used to generate the weather forecast module, or it may be different weather data. If the historical weather data includes unstructured weather data, the unstructured weather data may be processed as described herein to generate structured weather data. If the historical weather data includes both structured and unstructured weather data, a combined weather feature set may be generated as described herein.

In step 2606, historical outage data is received. The outage data may be formatted, cleaned, or otherwise preprocessed for input to an algorithm.

In step 2608, outage forecast modules can be generated based on the historical weather and outage data. Modules can be generated using heuristics or algorithms to form regression models, Markov chains, time series models, state space models, Bayesian models, boosted decision trees, neural networks, or any other appropriate model, or any combination thereof.

The specific heuristics, algorithms, or types of neural networks to be used for any particular outage forecast module may be selected based on the type of input data, and/or the historical success of using the heuristics, algorithms, or neural networks. Any required hyperparameters (e.g., numbers of layers, size of layers, number of nodes, number of hidden units, activation function, learning rate, momentum, etc.), for the heuristics, algorithms, or neural networks may be similarly selected.

After the heuristics, algorithms, or neural networks are selected, training data sets may be generated, and the outage forecast models may be trained based on training data sets as described with respect to FIG. 6. Multiple models may be generated and trained, and a best fit model may be selected from the multiple trained models to be used in the outage forecast module.

The weather forecasting techniques described herein can also be combined with other power plant parameters (e.g., historical plant generation, vibration data, turbine performance data (e.g., from wind turbines), etc.) to forecast power plant downtime or maintenance time windows, so that power plants are able to have time to better prepare in advance for such events.

More accurate short-term weather forecasting is also broadly applicable to retailers. For example, sandstorms in the Middle East cause people to take shelter and not go out, much as strong windstorms, tornadoes, and thunderstorms do all over the world. For companies that sell perishable goods (restaurants, grocery stores, convenience stores, etc.), the ability to more accurately predict weather can improve planning and minimize waste.

With respect to airlines, high winds (especially crosswinds) can heavily impact a plane's ability to take off and land. Advanced warning in the form of improved short-term wind forecasts can help airlines better optimize for anticipated flight delays, especially at key hubs. Strong storms can delay packages and again, more warning means better optimization.

Insurance companies collect all possible dimensional attributes of each policyholder to determine the premium rate. However, weather can also affect the accuracy of the ratemaking. The system described herein can automatically process all collected data, extract structured parameters from the data sources (e.g., weather information from satellite images), combine the parameters, build best fit predictive models, and generate a competitive, reasonable, and profitable premium rate.

Figure 7:
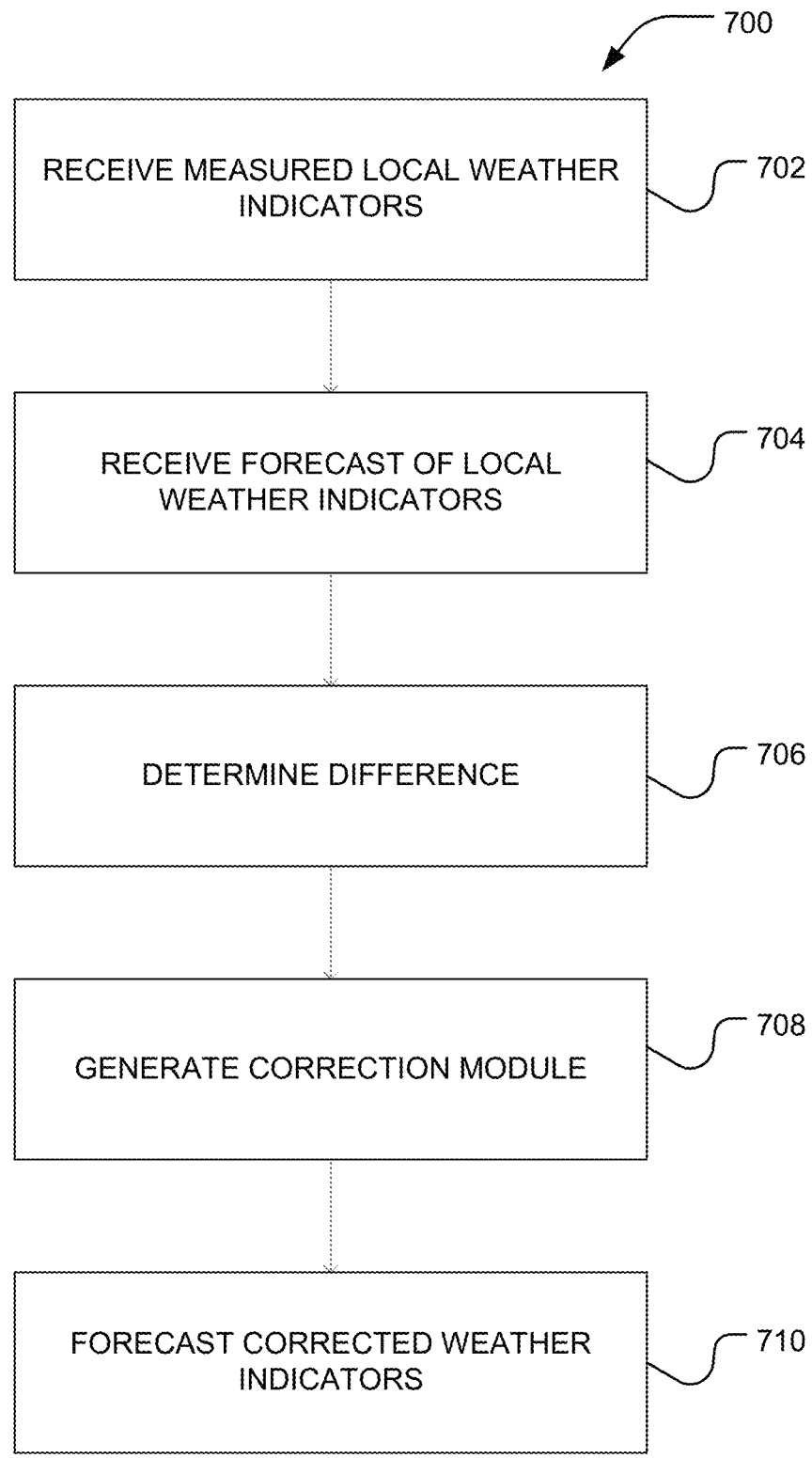
FIG. 7 illustrates an example method for generating and using an error correction module.

Weather forecasts of the systems and methods disclosed herein and/or weather forecasts provided by national bureaus using conventional modeling approaches can be further enhanced by analyzing error rates of historical forecasts as compared to measured local weather data, and creating a model that corrects the error. For example, as illustrated in FIG. 7, a method 700 includes receiving historical measured local weather data, as illustrated at step 702. The historical data may be for a single weather variable, e.g., wind speed, or any of the other weather variables identified herein.

As illustrated at step 704, historical forecasts regarding the weather variable can be received. The forecasts can be from a national or local weather bureau or can be determined using any of the techniques described herein.

As illustrated at step 706, a set of differences between the forecasts of the weather variable and the historical measurements of the weather variable can be determined. The forecasts and historical measurements can be normalized or otherwise processed prior to the comparison. For example, time intervals, vertical levels (e.g., height), averaged time periods, and/or units of measurements can be matched or synchronized between the forecasts and the measurements.

The historical forecasts and set of differences can be used in generating an error correction module, as illustrated at step 708. In one embodiment, the correction module comprises a neural network model, such as a recurrent neural network (e.g., RNN, LSTM, GRU, etc.) model, and the forecasts and set of differences are used to train the model. For example, one or more forecast data points can be used as a training input, with the calculated difference for a target time (e.g., 6, 12, or 18 hours, etc.) in the future as a training output. In one embodiment, the forecast data points can be a time series of points, ending a specified length of time prior to the target time. In one particular example, e.g., for a 6 hour forecast correction, the input forecast training data may be the data starting 12 hours prior to the target time and ending 6 hours prior to the target time, with the training output being the difference at the target time. Other time series and/or time windows of the forecast data may be used to train the model.

The set of training data may include all such combinations of training inputs and outputs that are possible from the historical data. For example, if the historical data includes 10 days of both measurement data and forecast data, and the data is normalized to 1 hour increments, a total of 240 data points may be provided. If an 8-hour window is used for the measurement data (training input), and the forecast time is 12 hours after the last input, each training data record will comprise a series of 8 measurement data points (e.g., measurement data points 1-8, measurement data points 2-9, etc.) and a forecast correction data point 12 hours later (e.g., correction data point 20, correction data point 21, etc.). Thus, using an 8-hour window, and a 12-hour forecast delay, 240 initial data points results in 221 total training records that may be used to train the model.

In one embodiment, the error correction module may use inputs in addition to the particular weather variable being corrected. Any variable that has an effect on the output may be used. For example, a forecasting correction module for correcting wind speed forecasts may also use non-wind speed weather data, e.g., temperature, etc., as inputs, as they may affect the output. The time of day and/or season (e.g., winter, spring, summer, fall) may also be used as inputs, as the magnitude of the error of the original forecast may depend on whether it is morning, evening, etc.

Figure 20:
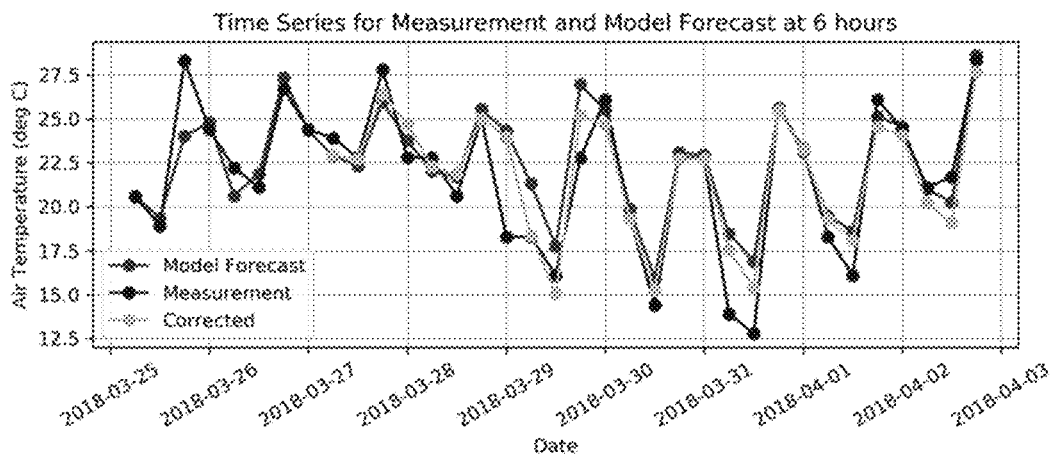
Figure 21:
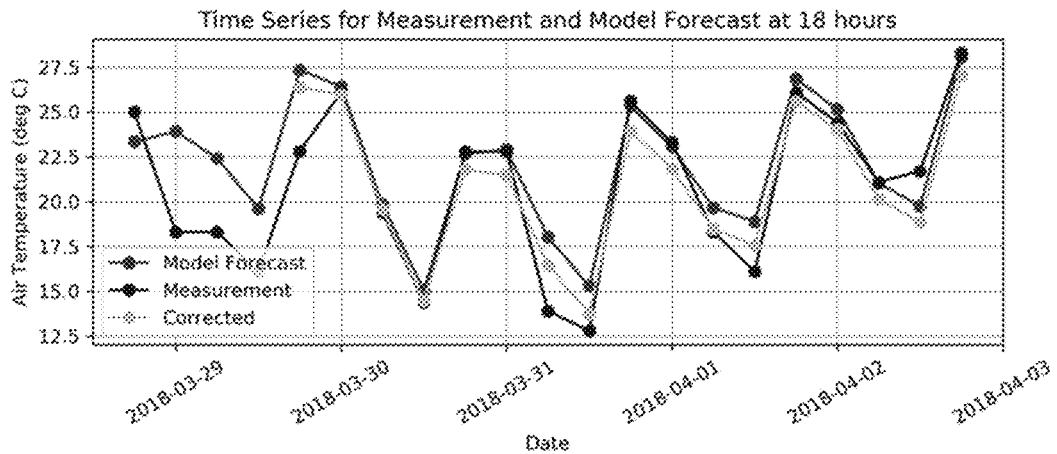

As illustrated at step 710, the trained correction module can be used to correct future forecasts of the local weather variable. A future forecast can be input to the model, which calculates a correction value that is applied to the forecast value, generating a corrected forecast value for the weather variable. As indicated in Table 1 and FIGS. 20, 21, 22, and 23, forecasts for weather variables can be substantially improved using this method. Tables 1a and 1b show that the root mean square error (rmse) is reduced using such a correction module. This is further illustrated in the figures. For example, FIG. 20 shows an improvement in the six hour forecast of windspeed. A similar improvement for windspeed at 18 hours is illustrated in FIG. 21. Such a time series approach can also be applied at 6 and 18 hours to air temperature, resulting in the improved forecasting as illustrated in FIGS. 22 and 23.

TABLE 1a

Comparison of wind speed rmse for the original NCEP model forecast and the corrected forecast at IAH airport.

| Forecast Hours | RMSE for Original Forecast (m/s) | RMSE for Corrected Forecast (m/s) |
|---|---|---|
| 6 | 1.68 | 1.31 |
| 12 | 1.54 | 1.47 |
| 18 | 1.64 | 1.50 |
| 24 | 1.68 | 1.42 |
| 48 | 1.72 | 1.47 |

TABLE 1b

Comparison of air temperature rmse for the original NCEP model forecast and the corrected forecast at IAH airport.

| Forecast Hours | RMSE for Original Forecast (° C.) | RMSE for Corrected Forecast (° C.) |
|---|---|---|
| 6 | 2.15 | 1.75 |
| 12 | 1.83 | 1.49 |
| 18 | 1.87 | 1.59 |

TABLE 1b-continued

Comparison of air temperature rmse for the original NCEP model forecast and the corrected forecast at IAH airport.

| Forecast Hours | RMSE for Original Forecast (° C.) | RMSE for Corrected Forecast (° C.) |
|---|---|---|
| 24 | 1.62 | 1.50 |
| 48 | 1.97 | 1.95 |

In one embodiment, the methods and systems disclosed herein can be applied to the forecasting of weather variables at offshore site, e.g., at oil platforms, etc. There exist weather buoys in the oceans that provide local weather measurements, but such buoys are spaced relatively far apart, and do not provide a sufficient density of weather measurements for accurate forecasting. In this embodiment, more reliance may be made on data from satellites, e.g., satellite images, videos, feeds, etc., as the density of local weather measurement stations is much lower.

Advantages of the present system include increased speed and accuracy of forecasting local weather indicators and/or variables. Such benefits may be particularly appreciated by weather-dependent industries including renewable energy, agriculture, and transportation. Errors in conventional weather forecasting models are frequently introduced during initialization, or the measurement of initial conditions, and amplified by the chaotic nature of the evolution equations of the dynamical system. In conventional, rules-based systems, imperfect or imprecise measurements of the atmospheric conditions at time zero tend to compound as these initial measurements form the foundation of forecasts ever further into the future.

The strength of the Artificial Intelligence (AI) approaches described herein are that they do not assume anything about the state of the world, unlike physical models, and therefore reduce many of these initialization errors. The present system uses AI techniques to achieve measurably better forecasts targeted to specific weather indicators as needed by the end user. In some embodiments, additional algorithms can be applied to fine tune hyperparameters of the models.

Embodiments of the subject matter and the functional operations described in this specification can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a tangible non-transitory program carrier for execution by, or to control the operation of, data processing apparatus (i.e., one or more computer programs). Program instructions may be, alternatively or additionally, encoded on an artificially generated propagated signal (e.g., a machine-generated electrical, optical, or electromagnetic signal) that is generated to encode information for transmission to suitable receiver apparatus for execution by a data processing apparatus. And the computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application," a "module," a "software module," a "script," or simply as "code." A computer program may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code). A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of central processing unit ("CPU"). Generally, CPU will receive instructions and data from a read only memory ("ROM") and/or a random access memory ("RAM"). The essential elements of a computer are a CPU for performing or executing instructions and one or more memory devices for storing instructions and data. Generally, a computer will also include, or be operatively coupled to receive data from or transfer data to, or both, one or more mass storage devices for storing data (e.g., magnetic, magneto optical disks, and/or optical disks). However, a computer need not have such devices. Moreover, a computer may be embedded in another device, such as but not limited to, a mobile telephone, a personal digital assistant ("PDA"), a mobile audio or video player, a game console, a Global Positioning System ("GPS") receiver, or a portable storage device (e.g., a universal serial bus ("USB") flash drive).

Computer readable media suitable for storing computer program instructions and data include all forms of nonvolatile memory, media and memory devices. For example, computer readable media may include one or more of the following: semiconductor memory devices, such as erasable programmable read-only memory ("EPROM"), electrically erasable programmable read-only memory ("EEPROM") and/or and flash memory devices; magnetic disks, such as internal hard disks or removable disks; magneto optical disks; and/or CD ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors and/or organic light-emitting diode ("OLED") monitors. The computer may further comprise one or more input devices by which the user can provide input to the computer. Input devices may comprise one or more of: keyboards, a pointing device (e.g., a mouse or a trackball). Input from the user can be received in any form, including acoustic, speech, or tactile input. Moreover, feedback may be provided to the user via any form of sensory feedback (e.g., visual feedback, auditory feedback, or tactile feedback). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a back-end component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Non-limiting examples of communication networks include a local area network ("LAN") and a wide area network ("WAN"), e.g., the Internet.

The computing system may include clients and/or servers. The client and server may be remote from each other and interact through a communication network. The relationship of client and server arises by virtue of computer programs running on the respective computers and having a client-server relationship to each other.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A method for forecasting a power-related variable, the method comprising:
    receiving historical unstructured weather data, the unstructured weather data comprising one or more images including weather-related features;
    processing the historical unstructured weather data to generate values for at least one weather variable, the processing comprising extracting hue information from the one or more images;
    receiving historical structured weather data;
    combining the historical structured weather data with the generated weather variable values to create a combined weather feature set;
    selecting one or more first algorithms based on one of more characteristics of the combined weather feature set;
    training the one or more first algorithms to forecast a weather indicator at least in part using the combined weather feature set, the weather feature set including at least one weather variable based on the extracted hue information;
    receiving historical data for the power-related variable;
    training a second algorithm to forecast the power-related variable at least in part using the received historical data for the power-related variable and one or more of the historical unstructured weather data and the historical structured weather data;
    receiving current structured weather data and current unstructured weather data; and generating a forecast for the power-related variable using the current structured weather data, the current unstructured weather data, the one or more trained first algorithms, and the trained second algorithm.

2. The method of claim 1, wherein the one or more first algorithms comprises one or more of regression models, Markov chains, time series models, state space models, Bayesian models, boosted decision trees, neural networks, convolutional neural networks, and recurrent neural networks.

3. The method of claim 1, wherein the processing of the historical unstructured data comprises segmenting each of the one or more images into a plurality of segments and extracting hue information from each of the plurality of segments.

4. The method of claim 3, wherein the hue information represents an image overlay.

5. The method of claim 1, wherein the power-related variable comprises power output.

6. The method of claim 1, wherein the power-related variable comprises electrical load.

7. The method of claim 1, wherein the power-related variable relates to the possibility of a power outage.

8. The method of claim 5, wherein the power-related variable comprises power output of a wind farm, and the historical data includes turbine data.

9. A method for forecasting a power-related variable, the method comprising:
receiving current structured weather data and current unstructured weather data, the unstructured weather data comprising one or more of: images, video, audio, and narrative text; and
generating a forecast for the power-related variable using the current structured weather data, the current unstructured weather data, one or more trained first algorithms, and a trained second algorithm;
wherein the one or more trained first algorithms are created by:
receiving historical unstructured weather data, the unstructured weather data comprising one or more images including weather-related features;
processing the historical unstructured weather data to generate values for at least one weather variable, the processing comprising extracting hue information from the one or more images;
receiving historical structured weather data;
combining the historical structured weather data with the generated weather variable values to create a combined weather feature set;
selecting one or more first algorithms based on one of more characteristics of the combined weather feature set; and
training the one or more first algorithms to forecast a weather indicator at least in part using the combined weather feature set to create one or more trained first algorithms the weather feature set including at least one weather variable based on the extracted hue information; and
wherein the trained second algorithm is created by:
receiving historical data for the power-related variable; and
training a second algorithm to forecast the power-related variable at least in part using the received historical data for the power-related variable and one or more of the historical unstructured weather data and the historical structured weather data.

10. The method of claim 9, wherein the one or more first algorithms comprises one or more of regression models, Markov chains, time series models, state space models, Bayesian models, boosted decision trees, neural networks, convolutional neural networks, and recurrent neural networks.

11. The method of claim 9, wherein the processing of the unstructured data comprises segmenting each of the one or more images into a plurality of segments and extracting hue information from each of the plurality of segments.

12. The method of claim 11, wherein the hue information represents an image overlay.

13. The method of claim 1, wherein the power-related variable comprises power output.

14. The method of claim 1, wherein the power-related variable comprises electrical load.

15. The method of claim 1, wherein the power-related variable relates to the possibility of a power outage.

16. The method of claim 13, wherein the power-related variable comprises power output of a wind farm, and the structured data includes turbine data.

* * * * *